United States Patent [19]
Yoneyama et al.

[11] Patent Number: 5,617,487
[45] Date of Patent: Apr. 1, 1997

[54] IMAGE CUTOUT APPARATUS

[75] Inventors: Tsutomu Yoneyama; Hiroshi Kinoshita, both of Tokyo, Japan

[73] Assignee: Konica Corporation, Tokyo, Japan

[21] Appl. No.: 303,618

[22] Filed: Sep. 9, 1994

[30]  Foreign Application Priority Data

Sep. 22, 1993  [JP]  Japan .................................. 5-236911

[51] Int. Cl.⁶ ............................. G06K 9/48; G06K 9/30; G06K 9/46; G01B 9/00
[52] U.S. Cl. ..................... 382/199; 382/316; 382/203; 364/550
[58] Field of Search .................. 382/199, 316, 382/203; 364/550; 250/202

[56] References Cited

U.S. PATENT DOCUMENTS 3,640,182  2/1972  Vertin ......................... 90/13.8
4,623,917  11/1986  Noguchi ..................... 358/80
4,884,224  11/1989  Hirosawa ................... 382/199

FOREIGN PATENT DOCUMENTS 63-5745  2/1988  Japan .......................... G03F 1/04

Primary Examiner—Leo Boudreau
Assistant Examiner—Monica S. Davis
Attorney, Agent, or Firm—Frishauf, Holtz, Goodman, Langer & Chick

[57] ABSTRACT

An apparatus for searching a contour line of an image to be cut out, has a displaying device to display an image obtained when an original image is subjected to photographic conversion scanning, a belt-shaped region setting device to set a belt-shaped region at a designated position located along a contour line of an image to be cut out, and a contour line searcher and processor to process image data in a belt-shaped region that has been set by the belt-shaped region setting device and to search a contour line of the image to be cut out, based on the image data processed by the processor.

8 Claims, 16 Drawing Sheets

SWITCHING TO
MANUAL MODE

IMAGE CUTOUT APPARATUS

BACKGROUND OF THE INVENTION

The present invention relates to a method and apparatus for searching a contour line of a cutout image in order to cut out and extract a necessary image region.

For example, in the case of printing a merchandise catalog, since a background is photographed in the merchandise photograph used as an original image of printing, it is necessary to erase the background of the merchandise so as to display only the merchandise.

For this reason, the following method is adopted: A mask film is provided, on which only an image portion is made transparent and other portions are made opaque. The mask film is put on an original image so as to erase the unnecessary background, and the photographic copying operation is conducted. In this way, an image in which only the merchandise is displayed can be provided.

Conventionally, the following mask forming techniques are known.

(1) Using an engraving scanner, Y (yellow), M (magenta), C (cyan) and K (black) images are read out from the original color image. In this case, image data of K (black) is used, and the mask film is made.

(2) A peel-off film is put on each print of Y, M, C and K. Then a skilled workman makes a mask film with a cutter in such a manner that the print is cut along a desired contour of the image.

(3) On an image processing working station for processing digitized image data, an operator traces a displayed image using a pointing device.

According to the above techniques of the prior art, the following problems may be encountered.

According to the technique described in item (1), a desired image is masked and extracted from the entire image only by the difference of density. Therefore, it is impossible to extract the desired image correctly.

According to the techniques described in item (2), it takes time to make a mask film, and further a heavy burden is imposed on the eyes of a work man, so that the working environment is deteriorated. Further, skilled workers are shorthanded, and the quality of obtained mask films fluctuates because it depends on the technique of workers.

According to the technique described in item (3), in the same manner as that of item (2), so that the same problems may be encountered, and there is a demand of automatizing the operation.

As described above, it is difficult to enhance the accuracy of extraction of a cutout image only by the skilled labor.

In order to solve the above problems, Japanese Patent Publication No. 5745/1988 (63-5745) discloses an apparatus in which a desired image can be cut out in the following manner: Using a difference between the density of an image region to be cut out and the density of a background, and also using a difference between the colors, a contour line of the image to be cut out is automatically found, and according to the found contour line, the desired image is cut out.

However, when the contour line is found in accordance with the difference of density and color according to the above method, there are various types of original images to be cut out. In some cases, a difference between the image region to be cut out and the background is very small, and it is difficult to accurately cut out a desired image.

Conventionally, a contour line of the image to be cut out is found from image data in accordance with a predetermined contour extracting condition (cutout condition). Therefore, the conventional method does not accurately correspond to a change in the background of the original image. Although cutout operations can be accurately conducted in a specific original image, it is difficult to stably cut out various original images.

SUMMARY OF THE INVENTION

The present invention is to provide an image cutout device by which an extracting condition for extracting a contour line can be appropriately set in accordance with the characteristics of individual images. The first object of the present invention is to stably conduct automatic cutout operation on original images of various types.

The second object of the present invention is to stably conduct automatic cutout operation on original images in such a manner that a contour line of the image to be cut out is automatically and accurately extracted while an operator conducts only a rough estimation and operation.

The first embodiment of the present invention is an image cutout apparatus by which a specific image is cut out in accordance with image data provided when an original image is subjected to photoelectric scanning. The construction of the first embodiment is shown in FIG. 1.

In FIG. 1, the cutout region designating means designates a region in which an image is cut out.

The condition setting region designating means designates a region for setting the cutout condition. The cutout condition setting means sets a cutout condition in accordance with image data of a region designated by the condition setting region designating means.

The image cutout means conducts image cutout operation in a region designated by the cutout region designating means in accordance with the cutout condition set by the cutout condition setting means.

In the second embodiment of the present invention, the cutout condition setting means sets a cutout condition in accordance with image data of a plurality of regions designated by the condition setting region designating means.

In the third embodiment of the present invention, the cutout condition setting means sets a cutout condition while a weight is given in accordance with an order designated by the condition setting region designating means.

In the fourth embodiment of the present invention, the cutout condition that has been set by the cutout condition setting means is commonly applied to a plurality of regions designated by the cutout region designating means.

In the fifth embodiment, a plurality of cutout conditions that have been set by the cutout condition setting means are selectively applied in accordance with each of the plurality of regions designated by the condition setting region designating means.

In the sixth embodiment of the present invention, in the case where the cutout condition setting means has a region in which the region designated by the cutout region designating means is overlapped on the region designated by the condition setting region designating means, a cutout condition is set while image data in the overlapped region is given a weight.

The seventh embodiment of the present invention is shown in FIG. 2.

In FIG. 2, the displaying means displays an original image in accordance with image data provided when the original image is subjected to photoelectric scanning, and the contour coordinate designating means designates a coordinate position adjacent to the cutout contour on the image displayed by the displaying means.

The belt-shaped region setting means sets a belt-shaped region located along a cutout contour including the coordinate position designated by the contour coordinate designating means, further the belt-shaped region that has been set in the above manner is displayed on the displaying means being put on the image to be cut out.

The contour line extracting means extracts a contour line of the image in accordance with image data in the belt-shaped region that has been set by the belt-shaped region setting means. The contour line displaying means displays a contour line extracted by the contour line extracting means in the belt-shaped region while the contour line is overlapped on the image to be cut out.

The image cutout means cuts out an image in accordance with the contour line extracted by the contour line extracting means.

In the image cutout apparatus of the eighth embodiment of the present invention, the contour line extracting means extracts a contour of the image again in the belt-shaped region each time the coordinate position is designated by the contour coordinate designating means and an end position of the belt-shaped region is changed.

In the image cutout apparatus of the ninth embodiment of the present invention, the contour line searching means searches a contour point located on a contour line in a row of image data in the width direction of the belt-shaped region. Further, extraction of a contour point is successively conducted for each row of image data in the order from the start point to the end point of the belt-shaped region in accordance with the order of the coordinate position determined by the contour coordinate designating means.

In the tenth embodiment of the present invention, the image data is color data, and the contour line extracting means extracts a contour line by the computation conducted between color image planes or conducted for each color image plane.

In the image cutout apparatus of the first embodiment of the present invention, a region in which the image is cut out and a region in which the cutout condition is set are individually set. In this case, when the region to be masked is specified, an image except for the image to be cut out is eliminated as possible, so that the image to be cut out can be easily extracted, and at the same time, for example, the background of the image to be cut out is designated as a region for setting the condition. Therefore, it becomes possible to cut out an image under the most appropriate condition for the characteristics of each image.

In the image cutout apparatus of the second embodiment of the present invention, according to image data in a plurality of regions that have been determined for setting the conditions, the cutout condition is set. Therefore, it is possible to set the most appropriate cutout conditions while judging from the plurality of regions.

In the image cutout apparatus of the third embodiment of the present invention, as described above, in the case where the cutout condition is set in accordance with image data of a plurality of designated regions, a weight is given according to the order of region designation. Therefore, the degree of contribution to the setting of a cutout condition can be ranked, so that more appropriate cutout conditions can be set.

In the image cutout apparatus of the fourth embodiment of the present invention, one cutout condition is used for curing out images in a plurality of regions. Therefore, image cutout operation can be stably conducted in the plurality of regions.

In the image cutout apparatus of the fifth embodiment of the present invention, a plurality of cutout conditions determined in accordance with a plurality of designated regions can be applied to each of the plurality of regions designated as a region in which an image is cut out.

In the image cutout apparatus of the sixth embodiment of the present invention, in the case where a region designated as a region in which cutout operation is conducted is overlapped with a region designated for setting a cutout condition, image data in a region designated for setting masking condition, that is, image data in a region that overlaps with the cutout region is assumed as the most appropriate image data for setting the cutout condition, and a weight is given to the image data in the overlapping region, and the cutout condition is set.

In the image cutout apparatus of the seventh embodiment of the present invention, an image to be cut out is displayed, and a coordinate position adjacent to the contour of the image to be cut out is designated while the display is observed. After the coordinate position has been designated, a belt-shaped region located along the cutout region including the coordinate position is set, and this belt-shaped region is displayed, and the setting condition of the belt-shaped region can be confirmed. In accordance with image data in the belt-shaped region, the contour line of an image is extracted and displayed together with the display of the belt-shaped region, and the automatically extracted contour line is visually checked. Finally, in accordance with the contour line extracted before, the image is cut out.

That is, when the contour of an image to be cut out is roughly designated, a contour line automatically extracted in the designated region is displayed being overlapped with the image, so that the coordinate can be designated while the coordinate designation of the contour line and the automatically extracted result are visually confirmed.

In the image cutout apparatus of the eighth embodiment of the present invention, the coordinate position is newly designated, and each time the end position of the belt-shaped region is changed, the contour extraction is conducted again, and the automatically extracted contour line is induced to a predetermined one by the designation of the coordinate position.

In the image cutout apparatus of the ninth embodiment of the present invention, it is estimated that the coordinate position is designated so that the contour line can be located approximately at a center with respect to the width direction. Therefore, a contour point is extracted from a row of image data in the width direction of the belt-shaped region, so that the contour line can be easily extracted. Further, the extraction of the contour point for each image data row is successively conducted from the start point of the belt-shaped region to the end point in accordance with the designated order of the coordinate position. Therefore, the contour line is successively extracted and displayed in accordance with the designated order of the coordinate position.

In the image cutout apparatus of the tenth embodiment of the present invention, when the image data is color data, by the computation between the color image planes or by the computation for each color image plane, the contour line is extracted according to a difference of the characteristics between the background color and the color of the image to be cut out.

The present invention is to provide a method of searching a contour line of an image to be cut out, comprising the steps of: displaying an image on a displaying means, the image being obtained when an original image is subjected to photoelectric conversion scanning; setting a belt-shaped region at a designated position located along a contour line of an image to be cut out; and processing image data in the belt-shaped region that has been set.

The eleventh embodiment of the present invention is shown by a solid line in FIG. 3. This embodiment is an apparatus for searching a contour line of an image to be cut out. The eleventh embodiment of the present invention comprises: a displaying means for displaying an image obtained when an original image is subjected to photoelectric conversion scanning; a belt-shaped region setting means for setting a belt-shaped region at a designated position located along a contour line of an image to be cut out; and a contour line searching and processing means for processing image data in a belt-shaped region that has been set by the belt-shaped region setting means and for searching a contour line of the image to be cut out.

The contour line searching and processing means may include a tracer for extracting a contour point located on the contour line of an image in accordance with the image data in the width direction of a belt-shaped region, wherein the tracer is moved in the longitudinal direction of the belt so as to continuously extract the contour point and search the contour line.

The belt-shaped region setting means may be constructed in such a manner that the width of the belt-shaped region is set at a ratio corresponding to the size of a cutout image displayed in the displaying means.

Also, the belt-shaped region setting means may be constructed in such a manner that a configuration of the belt-shaped region coincides with an external locus of a circle moved between designated two points.

Also, the belt-shaped region setting means may be constructed in such a manner that a weight distribution for determining a contour point by the tracer is set in the belt width direction of the belt-shaped region.

Also, the belt-shaped region setting means may be constructed in such a manner that a configuration of the belt-shaped region can be curved in the longitudinal direction.

As illustrated by a dotted line in FIG. 3, the apparatus of the present invention may include a mode switching means operated in the following manner: In the case where the tracer has determined a contour point outside the belt-shaped region, the searching operation of the contour line is stopped, and the mode is automatically switched to the manual cutout contour line setting mode.

The contour line searching processing means may be constructed in the following manner: In the case where the tracer can not extract a contour line, the contour line is set in the longitudinal direction of the belt-shaped region by means of extrapolation.

According to the cutout image contour line searching method or apparatus of the invention, while monitoring a displayed image and using a mouse, a belt-shaped region is set at a designated position along a desired cutout image contour line. Then, image data in the belt-shaped region is processed, and a contour line of the cutout image included in the region can be searched.

That is, by a simple setting operation in which a cutout image contour line is included in a belt-shaped region having a predetermined width, the contour line can be automatically searched, and when the length of the belt-shaped region is set voluntarily, the entire contour line can be searched by a small number of setting operations.

When the contour line is searched while the contour point is continuously extracted by moving the tracer, the contour line can be searched with high accuracy.

When the width of the belt-shaped region is set at a ratio corresponding to the size of a cutout image displayed in the displaying means, it is possible to prevent the contour line from deviating from the belt-shaped region, and further it is possible to prevent the occurrence of two contour lines in the width direction, so that the belt-shaped region can be easily set.

When the configuration of the belt-shaped region coincides with an external locus of a circle moved between designated two points, the belt width can be made constant even when the belt-shaped region is set in any direction, so that the accuracy of contour line searching can be enhanced.

When a weight distribution for determining a contour point by the tracer is set in the belt width direction of the belt-shaped region, the contour point can be extracted while consideration is given to the probability of designating the center of the belt width at a position close to the contour line. Therefore, it is possible to prevent the contour point from being mistakenly extracted.

When the configuration of the belt-shaped region is curved in the longitudinal direction, with respect to a contour line of which the radius of curvature is large, the belt-shaped region can be curved so as to include the contour line. Therefore, the number of region setting operations can be reduced, and the accuracy of contour line searching operation can be enhanced.

In the case where the tracer has determined a contour point outside the belt-shaped region, the searching operation of a contour line is stopped, and the mode is automatically switched to the manual masked contour line setting mode. When this construction is adopted, countermeasures can be taken against a case in which the contour line has deviated from the belt-shaped region so that searching the contour line can not be continued.

When the tracer can not extract the contour point, the contour line is set in the longitudinal direction of the belt-shaped region by means of extrapolation. When this construction is adopted, the contour line can be estimated at a high probability.

DETAILED DESCRIPTION OF THE PREFERRED EMBODIMENTS

Examples of the present invention will be explained below.

Figure 1:
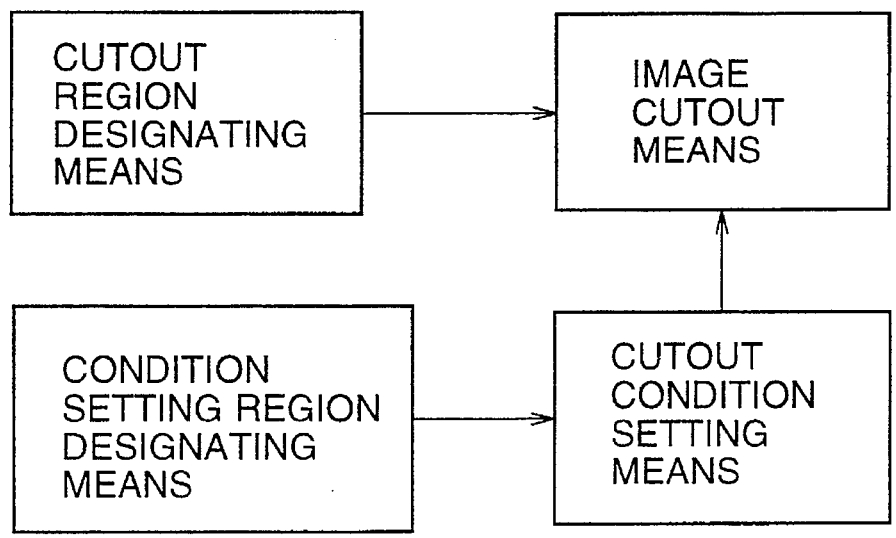
FIG. 1 is a block diagram showing an essential construction of the apparatus of the present invention.
Figure 2:
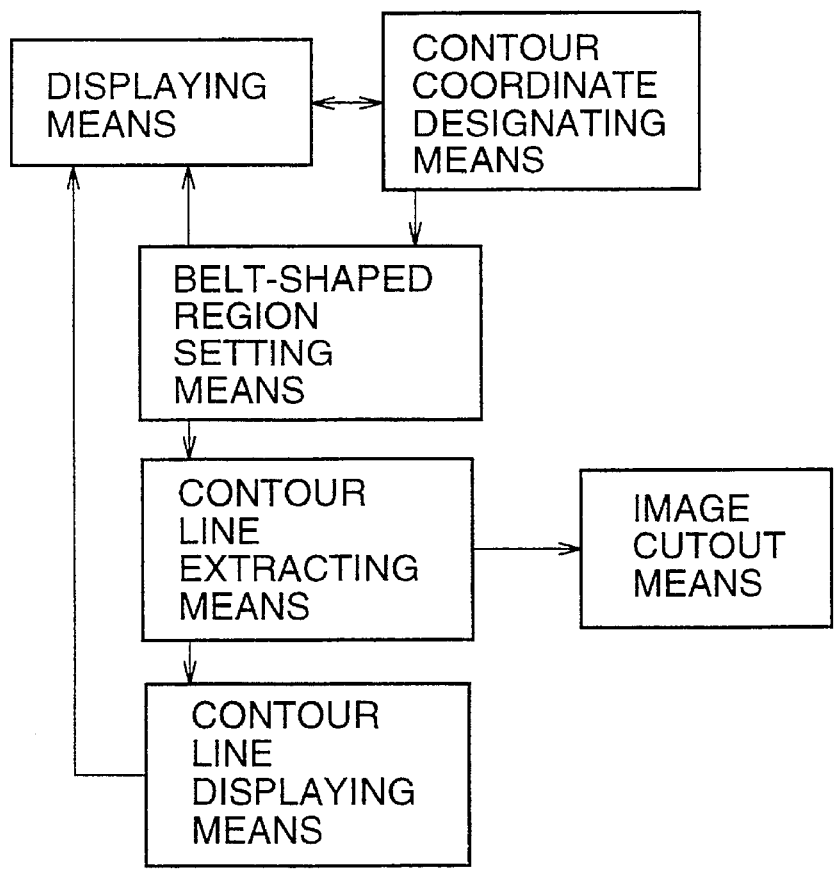
FIG. 2 is a block diagram showing another essential construction of the apparatus of the present invention.
Figure 3:
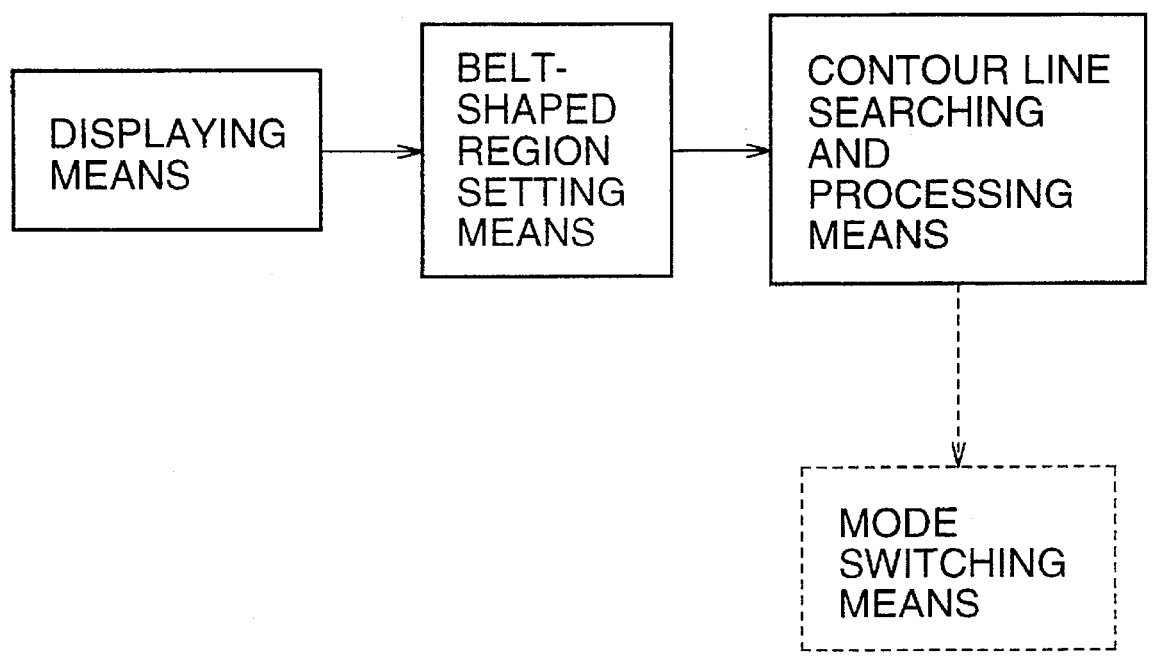
FIG. 3 is a block diagram showing still another essential construction of the apparatus of the present invention.
Figure 4:
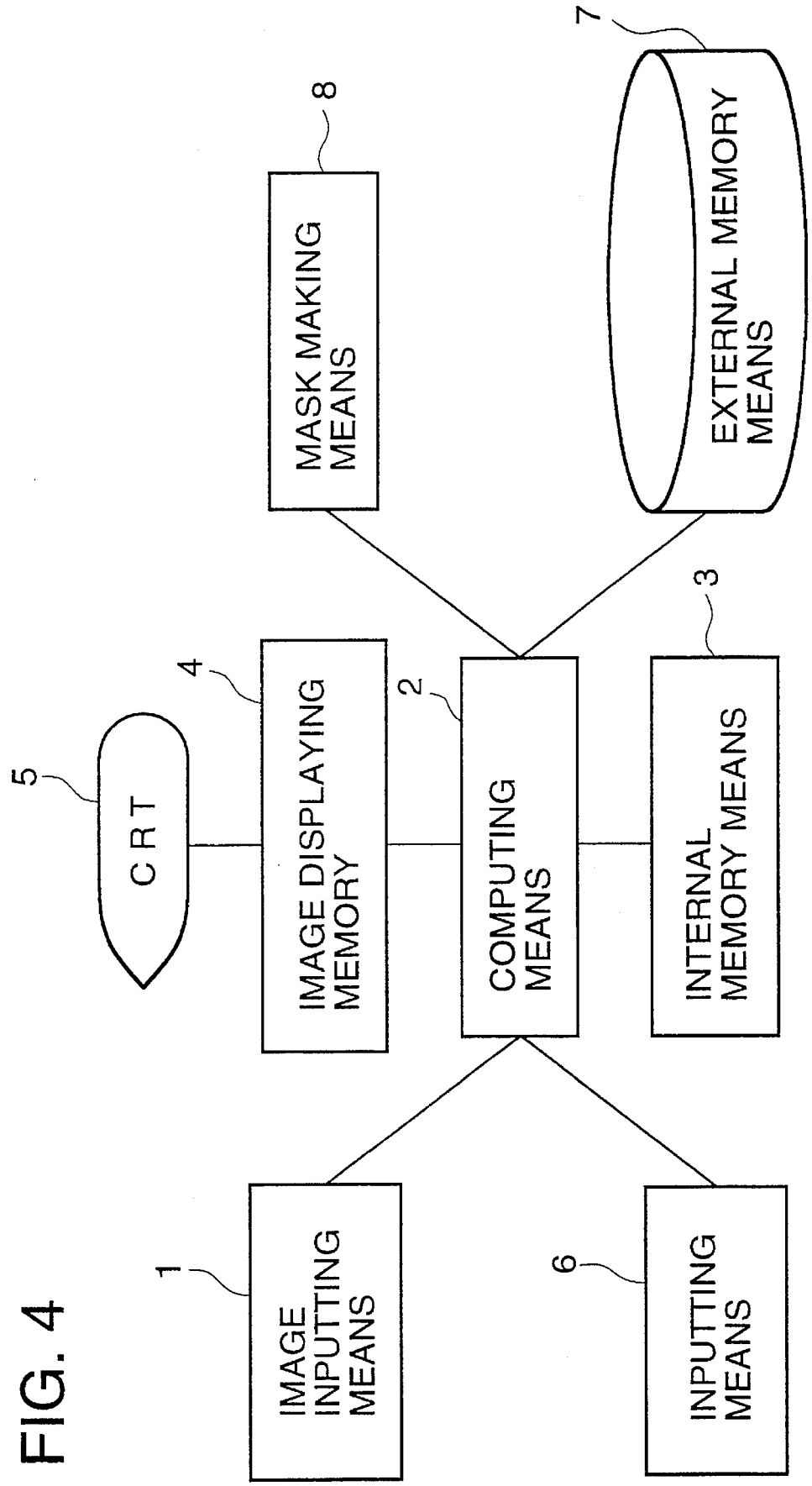
FIG. 4 is a block diagram showing a system construction of the example of the present invention.

FIG. 4 is a block diagram showing a hardware construction of this example. By the image inputting means 1, an original image such as a color photograph of commodity is subjected to photoelectric scanning so that color separation image data can be provided. The color separation image data provided by this image inputting means 1 is sent to the internal memory means 3 composed of RAM through the computing means 2. Then the color separation image data is temporarily stored by the internal memory means 3.

The color separation image data is also stored in the image displaying memory 4. When a signal is sent from the image displaying memory 4, the original image is displayed on the CRT5 (displaying means).

The first example is shown below, which is an extracting means for extracting an image to be cut out in a region designated by an operator.

The computing means 2, which is a cutout condition setting means and an image cutout means, extracts a contour of the image (primary image) to be cut out in accordance with the color separation image data, so that copied image data of the primary image from which the background is erased is set. In accordance with the copied image data, a mask for printing is made by the mask making means 8.

The computing means 2 is connected with the inputting means 6 which is a man-machine-interface. Various image cutout information and direction can be given to the computing means 2 by an operator through the inputting means 6.

Figure 9:
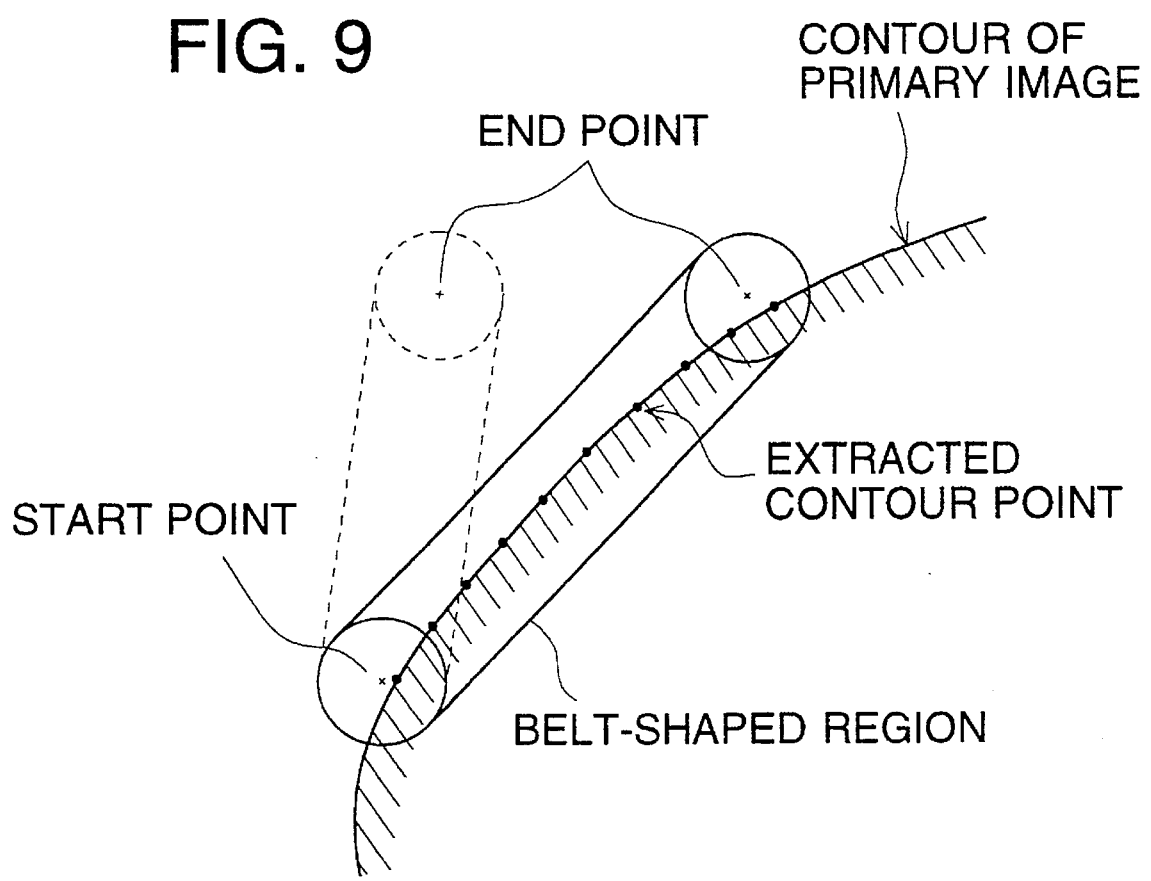
FIG. 9 is a view showing a correlation between the setting of the belt-shaped region and the contour line.

First, the start point is set by the region designating means shown in FIG. 9. After that, a belt-shaped region is set between the start and end points. While the end point is searched, it is possible to rotate the belt-shaped region setting region connecting the start point with the end point around the start point (the fixed shaft), and the contour setting region can be freely moved as shown by a broken line in FIG. 9. In this connection, the following method may be adopted:

The end point is set from the background side, and the primary image and the background are discriminated by a relation between the setting direction of the contour setting region and the contour line extracted later.

In this example, the inputting means 6 functions as the cutout region designating means for designating a region in which cutout of an image is conducted and also functions as the condition setting region designating means for designating a region in which the cutout condition of an image (contour extracting processing condition) is set.

The inputting means 6 includes a pointing device such as a mouse and track ball. While the operator is monitoring an original image displayed on the CRT5, a region to be subjected to cutout processing, that is, a region including a contour line of cutout (mask region) is designated by the pointing device described above in such a manner that the coordinate position is inputted, and also a region appropriate for setting a condition (condition setting region) in the automatic extraction of a contour line is designated when the pointing device inputs a coordinate position (shown in FIG. 5).

As described above, a region to be cut out including the contour portion is roughly designated by the inputting means 6 which is a cutout region designating means. Due to the foregoing, an amount of image data which is an object of automatic extraction can be reduced as small as possible, so that the operation of contour extraction can be accurately conducted in a short period of time.

In the automatic contour extraction based on the computation processing of image data, a difference of density or color which is assumed to be a contour to be cut out, differs by the setting of the background. Therefore, under a constant cutout condition, it is difficult to extract the contour line stably, and also it is difficult for an operator to appropriately command the difference of density or color in the form of a value of the contour extracting condition. In order to solve the above problems, in this example, image cutout operation can be stably conducted in the following manner:

The operator designates the background of the image to be cut out as a condition setting region, and the cutout condition is set in accordance with the designation. In this way, in accordance with the setting of the individual background, cutout operation can be stably conducted.

By the construction described above, the computing means 2 extracts a contour of the primary image from the color separation image data. Then the result of the image cutout operation conducted by the computing means 2 is stored in the outer memory 7 composed of a hard disk or optical disk, and further the result of the image cutout operation is given to the mask making means 8.

In accordance with the image data subjected to the aforementioned cutout processing, the mask making means 8 paints out an unnecessary portion except for the image portion, and further the mask making means 8 computes the mask data so that the mask data can be extended or reduced. In this way, the mask data is made so as to be used for compiling computation. In this connection, it is possible to make a mask film using the aforementioned mask data.

Figure 6:
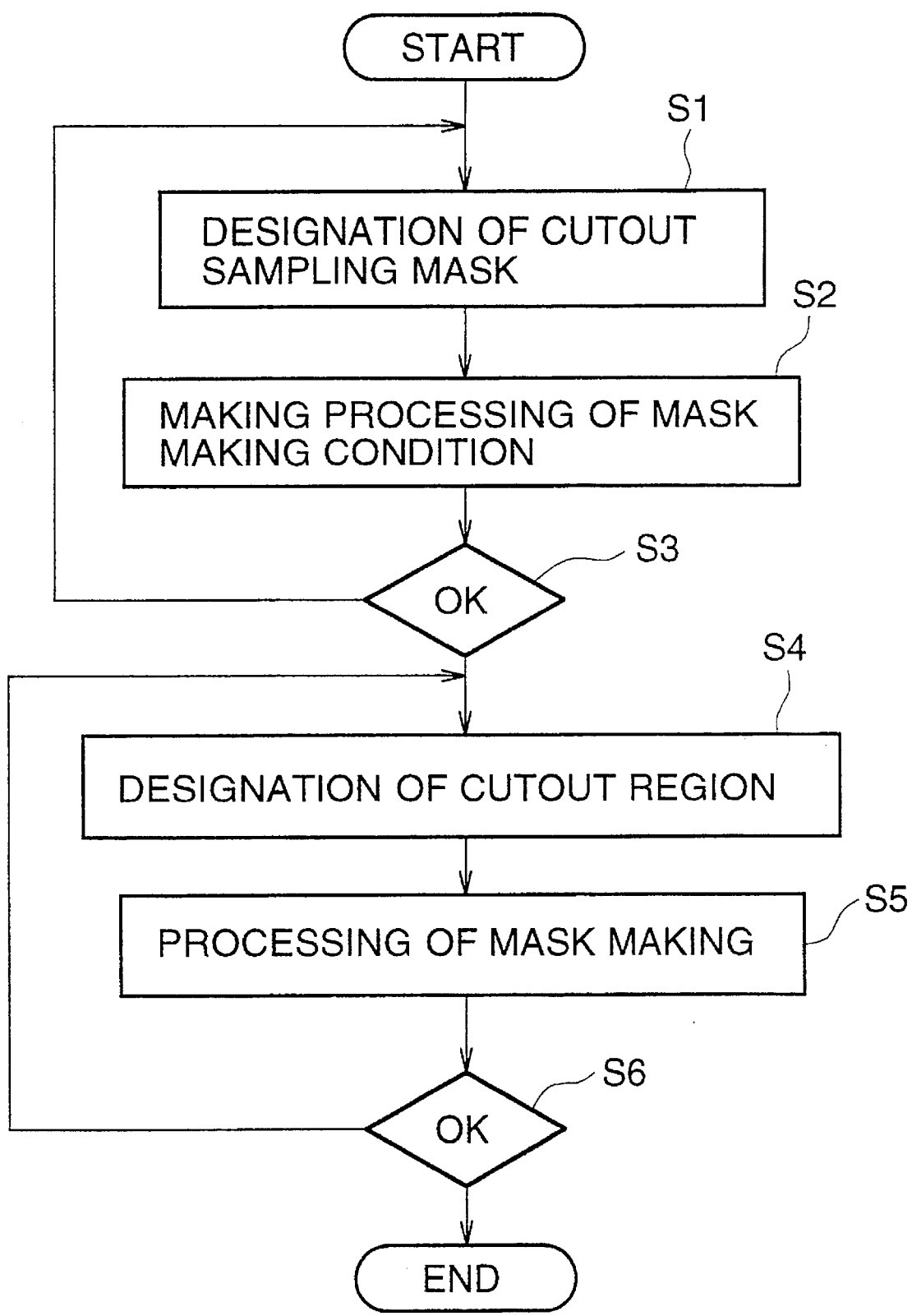
FIG. 6 is a flow chart showing an example of image cutout processing conducted by designation of the condition setting region.

FIG. 6 is a flow chart showing the procedure of image cutout operation conducted by the above construction.

In the flow chart shown in FIG. 6, the condition setting region is designated through the inputting means 6, wherein the condition setting region is defined as a region where the operator conducts sampling of the image data which is a base of condition setting in the automatic contour extraction. (S1: the condition setting region designating means)

Figure 5:
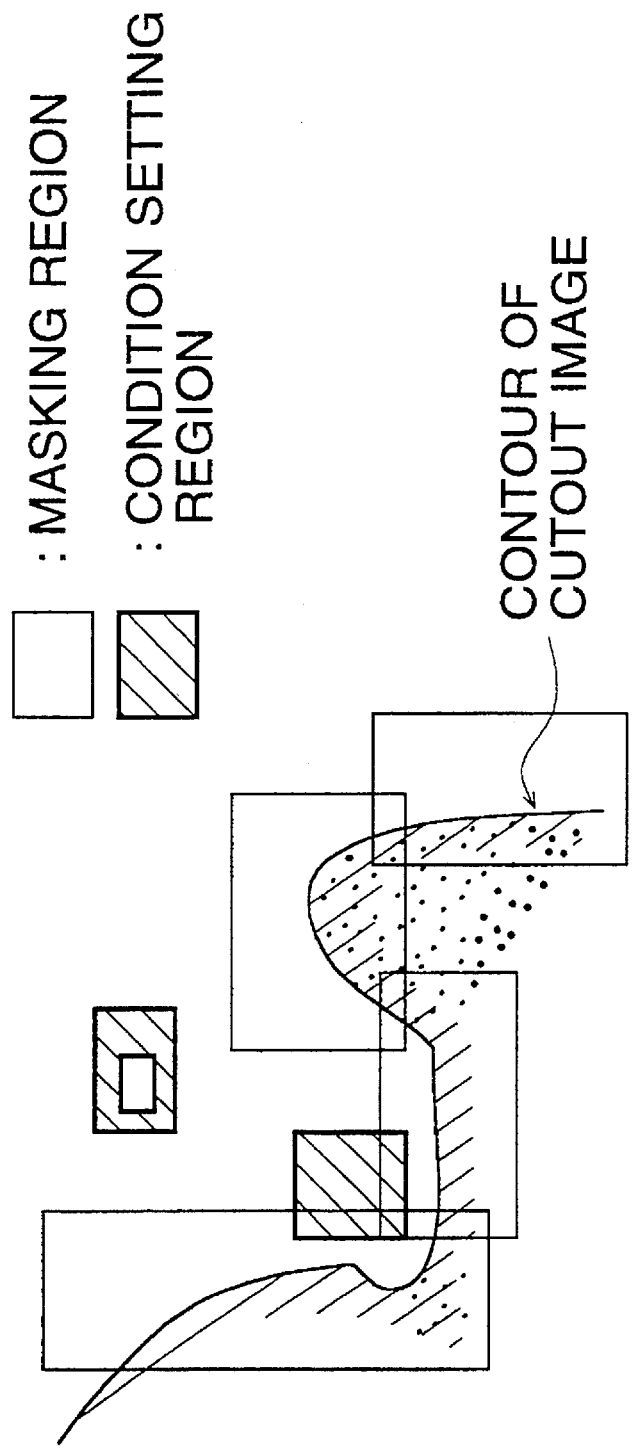
FIG. 5 is a schematic illustration showing the circumstances of designation of the condition setting region and cutout processing region.

In the designating operation of the condition setting region, while watching an original image displayed on the CRT5, the operator designates a region including only the background of the primary image with the pointing device (shown in FIG. 5). Specifically, as illustrated in FIG. 5, when the coordinate of a vertex is designated with the pointing device, a square region can be designated, and the result of the designation may be put on the original image displayed on the CRT5 so that a line image can be displayed. As illustrated in FIG. 5, in the case where a region is designated to be in the region which has already been designated as the condition setting region, an annular region surrounded by the two regions is set to be a condition setting region. In the case where an inappropriate image is included in the background, this portion can be easily excluded.

The number of the condition setting region may be either one or plural. In the case where the background is not constant, that is, in the case where the background varies, a plurality of typical regions in the background portion are designated as the condition setting region, so that the most appropriate cutout condition can be set in the condition setting processing described layer.

In the case where a plurality of regions are designated as the condition setting region, there is a possibility that the regions are divided into two groups, one is a group of regions which greatly contribute to the condition setting, and the other is a group of regions which is used only for information. Therefore, the condition setting regions are weighted in accordance with the order of the designation. In this case, it is preferable that the image data included in a region designated earlier greatly affects the condition setting, and it also preferable that the operator selects whether or not the weighting is conducted in accordance with the order of designation.

Designation of the condition setting region and that of the cutout processing region (mask region) are not limited to the operation conducted by the pointing device in such a manner that the coordinate position of the vertex of the square region is designated with the pointing device. The designation of the condition setting region and that of the cutout processing region may be conducted using a digitizer or tablet so that an arbitrary configuration can be designated.

After the completion of the designation of the condition setting region, the computing means 2 conducts sampling on the image data in the region designated as the condition setting region. According to the image data subjected to sampling, in other words, according to the image data in the background of the primary image, the setting of the cutout condition (mask making condition) of the primary image is conducted (S2: cutout condition setting means).

The cutout condition is set in the following manner: For example, the average (r+g+b)/3 of color separation image data (the three primary color signals r, g, b of R, G, B) in the condition setting region is found. While this average value is used as a threshold value, the pixels in the cutout processing region are discriminated into the pixels in the background and the pixels in the primary image.

Due to the foregoing, discrimination (contour extraction) between the pixels in the background and the pixels in the primary image can be highly accurately conducted in accordance with the characteristics of the background portion. That is, when contour extraction is conducted under the constant condition, it is difficult to perform a stable cutout operation because the contour extraction can not cope with a change in the background. However, when an image in the background is specified by the designation of the condition setting region, the specified background portion can be easily discriminated in the region to be subjected to cutout processing. Therefore, a highly accurate cutout operation can be conducted on images in a wide range.

In the case where the cutout condition (the threshold value of image signal discrimination) has been determined in accordance with the designated condition setting region, the condition is displayed on the CRT5, so that the operator can judge whether a desired cutout condition is set or not.

It is clear that the setting of the cutout condition is not limited to the average of the image signals described above. For example, color image data included in the condition setting region may be averaged for each color image plane, and a threshold value may be set for each color in accordance with the average. Instead of the average, in accordance with the most frequent image data in the condition setting region, the threshold value may be set. Further, the primary color of the background portion (condition setting region) may be specified according to histogram information of each color, so that only the discrimination of the primary color can be conducted in the process of contour extraction.

After the completion of the designation of the condition setting region, and also after the completion of the setting of the cutout condition according to the designated region (S3), a region from which the image is actually cut out (masking region) is designated by the inputting means 6 (S4: cutout region designating means).

The cutout processing region is designated in the following manner:

In the same manner as the designation of the condition setting region, while watching an original image on the CRT5, the operator designates a region including a boundary between the primary image and background with a pointing device by means of coordinate designation. Then the cutout processing region that has been set in the above manner is displayed in the CRT5 being put on the original image.

In the case of designation of the processing region, it is preferable that an area of the designated region is reduced as small as possible, because a burden imposed on the automatic contour extracting processing can be reduced. Therefore, as illustrated in FIG. 5, it is preferable that the boundary portion is divided into a plurality of regions so as to be designated. In order to cover all the contour portion so that the contour portion can be included by the processing region, the designated processing regions are permitted to overlap with each other. Finally, the processing region includes the plurality of designated processing regions.

It is preferable that a portion of the condition setting region which has already been designated overlaps with the designated processing region. Further, it is preferable that the designated processing region is permitted to include the condition setting region.

When the cutout region is designated, a profile of the cutout region is not limited to the square region illustrated in FIG. 5, and the designated region may be formed into an arbitrary profile.

In the case where a primary image to be cut out is small, the cutout processing region may be designated in such a manner that the primary image can be included in the cutout processing region.

After the completion of region designation for cutout processing, in accordance with the cutout condition that has been set, a contour line of the primary image is automatically extracted in the cutout processing region (S5: image cutout means). In the case where the automatic extracting processing is normally conducted (S6), the extraction is finally determined, and the mask is made (S5).

Specifically, the extracting operation is conducted as follows:

In the case where the cutout condition is set from the image data in the condition setting region in the form of a threshold value of the image data, the image data in the designated processing region is compared with the threshold value, and pixels corresponding to the primary image is separated from pixels corresponding to the background. In this way, the contour of the primary image can be extracted.

In the above example, according to the image data in one or a plurality of condition setting regions, one common cutout condition is set in a plurality of processing regions, so that the cutout processing is carried out in the plurality of processing regions under a predetermined condition.

Consequently, in the case where the cutout condition is set in accordance with a plurality of condition setting regions, an appropriate cutout condition can be set while consideration is given to the changing background. Further, when one cutout condition is commonly used for a plurality of processing regions, the cutout processing can be conducted in each processing region under the same condition.

In this case, it is preferable that the extracted contour line is displayed on the CRT5 being put on the original image, and the operator judges whether or not the result of automatic extraction is correct. In the case where the automatically extracted contour is defective, correction may be manually made by the pointing device, or the cutout condition may be manually changed. Alternatively, the condition setting region may be designated again.

According to the procedure shown in FIG. 6, the condition setting region is previously set, the cutout of the primary image is extracted from the cutout processing region (the number of which is single or plural) in accordance with the cutout condition determined according to the image data included in the condition setting region (the number of which is single or plural). However, as illustrated in FIG. 7, the cutout processing region may be previously designated, and the condition setting region for setting the cutout processing condition in this region may be designated after.

In either case, designation may be made so that the condition setting region can include only the background, and it is not concerned with the position of the cutout region.

Figure 7:
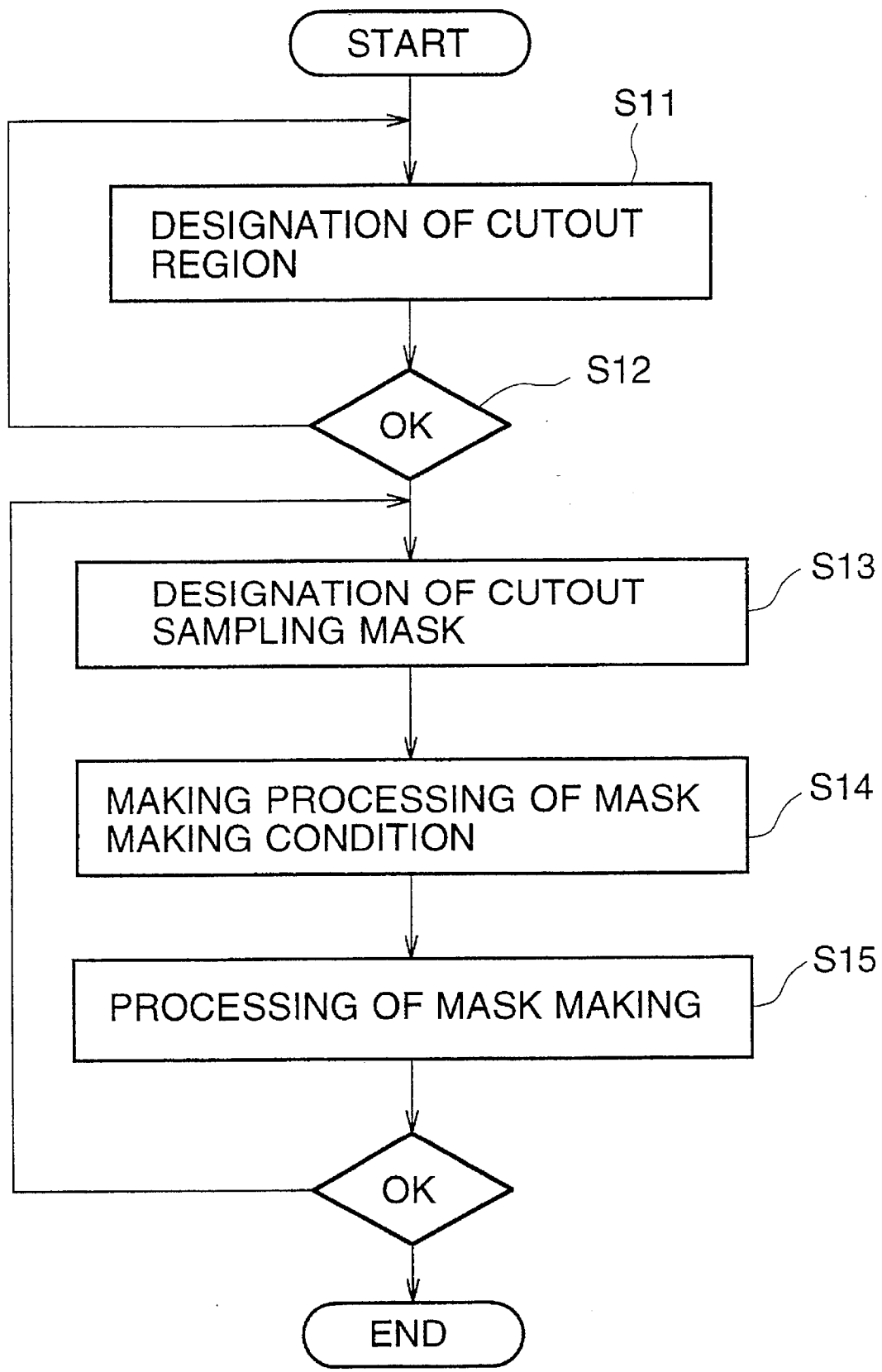
FIG. 7 is a flow chart showing another example of image cutout processing conducted by designation of the condition setting region.

In the flow chart shown in FIG. 7, first, the designation of the cutout processing region (the number of which is single or plural) including the contour of the primary image (shown in FIG. 5) is conducted by the operator with the pointing device in the same manner as that shown in the flow chart of FIG. 6 (S11: cutout region).

After the designation of the processing region has been completed in such a manner that all the contour of the primary image is covered (S12), the condition setting region (the number of which is single or plural) for setting the cutout processing condition in the designated processing region is designated by the operator with the pointing device in the same manner as that illustrated in the flow chart of FIG. 6 (S13: condition setting region designating means).

In this case, the condition setting region may be set in such a manner that the condition setting region can be included in the processing region. Alternatively, the condition setting region may be permitted to overlap with a portion of the processing region.

After the condition setting region has been designated (the number of the condition setting region is single or plural), the cutout condition is set which is used when the primary image is cut out (the contour is extracted) in accordance with the image data of the condition setting region, that is in accordance with the image data corresponding to the background of the primary image (S14: cutout condition setting means).

In the case where a plurality of condition setting regions have been set, in the same manner as described before, the regions may be weighted in the order of designation so that the cutting condition can be set.

According to the procedure shown in the flow chart of FIG. 7, the processing region has already been designated when the condition setting region is designated. Therefore, when the cutout condition is set, a correlation between the condition setting region and the processing region is specified. In the case where the processing region overlaps with the condition setting region, the image data in the overlapping region is of the background close to the contour of the primary image. Accordingly, the image data of the overlapping region may be weighted with respect to the image data in the region to be overlapped, so that the image data of the overlapping region can greatly affect the setting of the cutout condition.

After the completion of the setting of the cutout condition, the contour line of the primary image is extracted from each designated processing region in accordance with the cutout condition. In this way, the mask is made (S15: image cutout means).

In this connection, the condition setting region may be varied for each processing region in the following manner: After a plurality of cutout regions have been designated, or each time the cutout processing region is designated, a region for setting the cutout condition is specified for each processing region. Alternatively, a plurality of condition setting regions have been designated, or each time the condition setting region is designated, a region for cutting out under the cutout condition according to each condition setting region is specified and directed. For example, with respect to the processing region A, the cutout condition is set according to the image data of the condition setting region "a", and with respect to the processing region B, the cutout condition is set according to the image data of the condition setting region "b".

Due to the foregoing construction, even when the background of a primary image is not uniform, that is, even when the background changes from position to position, the contour can be accurately extracted under a plurality of cutout conditions according to the change of the background.

For example, with respect to the processing region A, the cutout condition is set in accordance with the image data of the condition setting regions "a" and "b". With respect to the processing region B, the cutout condition is set in accordance with the image data of the condition setting regions "b" and "c". In the above manner, although a combination of the condition setting regions corresponding to each processing region is different, a partially overlapping condition setting region may be provided.

In the case where the processing region and the condition setting region are displayed on the CRT5, an identification code may be put on each region, so that a relation between the processing region and the condition setting region can be easily checked, and further the relation can be easily directed.

In this connection, in the case where the operator roughly designates a region including the contour portion to be cut out, it is preferable that a burden imposed on the automatic contour extracting processing is reduced, and in order to enhance the accuracy, it is preferable that a narrow region is simply designated along the contour of the primary image. Further, it is preferable that the contour extraction is conducted in accordance with the region designation commanded by the operator.

An example will be explained below, in which the region designation of a cutout portion and the contour extraction are preferably carried out. The following second example is explained with reference to the hardware construction shown in FIG. 4 described in the first example.

Figure 8:
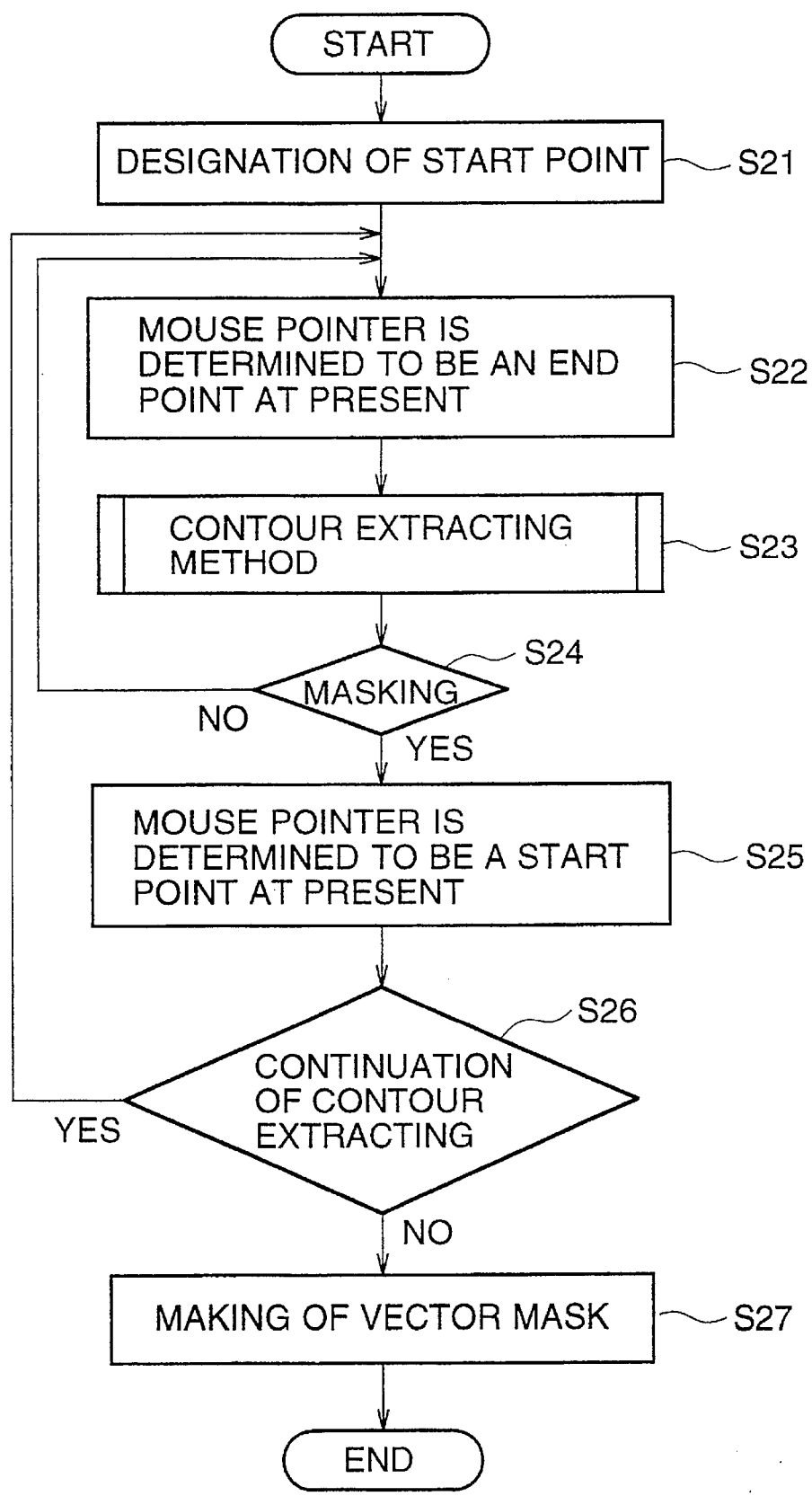
FIG. 8 is a flow chart showing an essential procedure of the cutout processing of the second example.

The flow chart shown in FIG. 8 shows a fundamental procedure for making a mask in the second example. First, while watching an original image on the CRT5 (displaying means), an operator operates the inputting means 6 (pointing device), so that the coordinate position of a point on the contour line of the primary image is inputted as a start point for extracting the contour (S21: contour coordinate designating means).

When the coordinate positions of the start and end points are inputted, as illustrated in FIG. 9, a belt-shaped region is set which linearly connects a circle having a predetermined radius formed around the start point with a circle a predetermined radius formed around the end point. In this way, the belt-shaped region is set as a contour extracting region (cutout region). This belt-shaped region is displayed on the CRT5 being put on the original image. Then the contour extraction is conducted in the extracting region by the computing means 2, and the extracted contour is displayed on the CRT5 being put on the image (S23: belt-shaped region setting means, contour line extracting means, and contour line displaying means).

In the first example, the region is designated in such a manner that the contour line is surrounded. On the other hand, in the second example, when a primary point on the contour line is designated, the contour extracting region including the contour line is set.

When the operator designates primary points on the contour line with a pointing device such as a mouse in such a manner that the operator traces the contour line of the primary image, a narrow region including the contour can be handily designated. In the belt-shaped region of this example, there is a high possibility that the contour line of the primary image is located at a position close to the center with respect to the belt-shaped region. Accordingly, the contour can be easily extracted from the belt-shaped region.

As described above, when the coordinate position of the primary point on the contour of the primary image is inputted, the belt-shaped region (cutout extracting region) is set, and a series of contour point extraction is conducted. Until this extracting operation is completed (S24), a point at which the coordinate position is inputted by the inputting means 1 is successively made to be an end point, and the contour extraction is conducted (contour line extracting means).

That is the operation is carried out as follows. When a point on the contour line of an image to be cut out is designated for the first time, this point is set as a start point. When a different point on the contour line is designated after that, a belt-shaped region connecting the start point with the end point is set, and the contour extracting operation is conducted in this belt-shaped region. When a new point on the contour line is newly designated, a new belt-shaped region is set from the previous end point to the newly designated point (end point), so that the belt-shaped region is extended. In this extended belt-shaped region, the contour extracting operation is conducted. Until a series of contour line is covered with the belt-shaped regions, the coordinate inputting operation is repeatedly conducted on the point on the contour line.

In this case, in the case where the end point is newly set, it is preferable that the contour found previously is once canceled and the contour extracting operation is newly conducted in the overall belt-shaped region. The reason why is described as follows:

In the case where a plurality of contour point candidates are detected in the contour extraction and one contour point is finally selected from these points, a direction of the contour line is determined by the renewal setting of the end point, so that the contour point candidate to be selected is affected. In the orientation of the contour extraction by the designation of the end point, the extracted contour point is displayed on the CRT5. Therefore, it is possible for the operator to intentionally designate the end point by the display of the contour point so that the extracted contour line can be guided in a predetermined direction.

When the color and lightness of the region in this belt-shaped region are different from those of the surroundings, the visuality on CRT5 is enhanced. The width of the belt-shaped region can be adjusted and further selected from a plurality of widths.

After a series of contour line has been extracted, a start point of contour extraction is newly designated (S25). In the same manner, the belt-shaped region is set and the contour is extracted. Until all the contour line is extracted, the above processing is repeated (S26).

After all the extraction has been completed, the extracted contour points are made to be vector values (the extracted points are connected with each other), so that a mask image is formed (S27: image cutout means).

Figure 10:
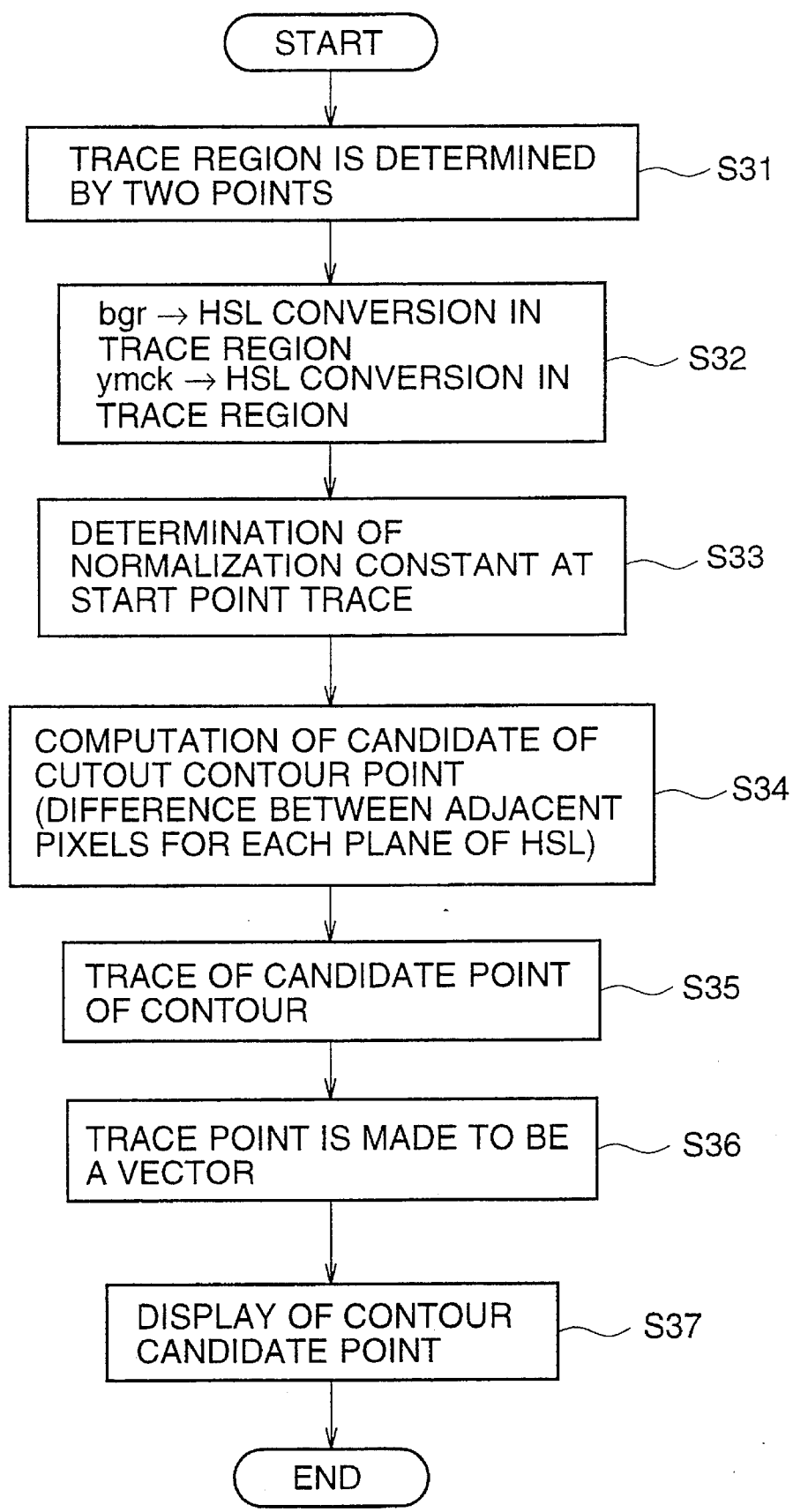
FIG. 10 is a flow chart showing the content of processing of contour extraction.

Next, with reference to the flow chart shown in FIG. 10, the circumstances of contour extraction in S23 shown in the flow chart of FIG. 8 will be explained in detail as follows.

First, as described above, in accordance with the primary points (start and end points), the coordinate of which is inputted on the contour an image to be cut out, a belt-shaped region for detecting the contour point is set (S31: belt-shaped region setting means).

Color image data (R, G, B or Y, M, C, K) is provided from an original image by means of photoelectric conversion. The color image data located in the belt-shaped region is converted into data of H (hue), S (saturation) and L (lightness) by a well-known method (S32).

Then, a normalization constant of a plurality of image data used for extraction of the contour point is set (S33). Specifically, the normalization is conducted as follows: In order to make a difference between the maximum and the minimum of each image data to be the same, the maximum $X_{max}$ and the minimum $X_{min}$ of image data are found, and normalization is conducted in accordance with the expression of $X=X/(X_{max}-X_{min})\times 100$. In this case, $X=R, G, B, H, S$ and $L$.

Figure 11:
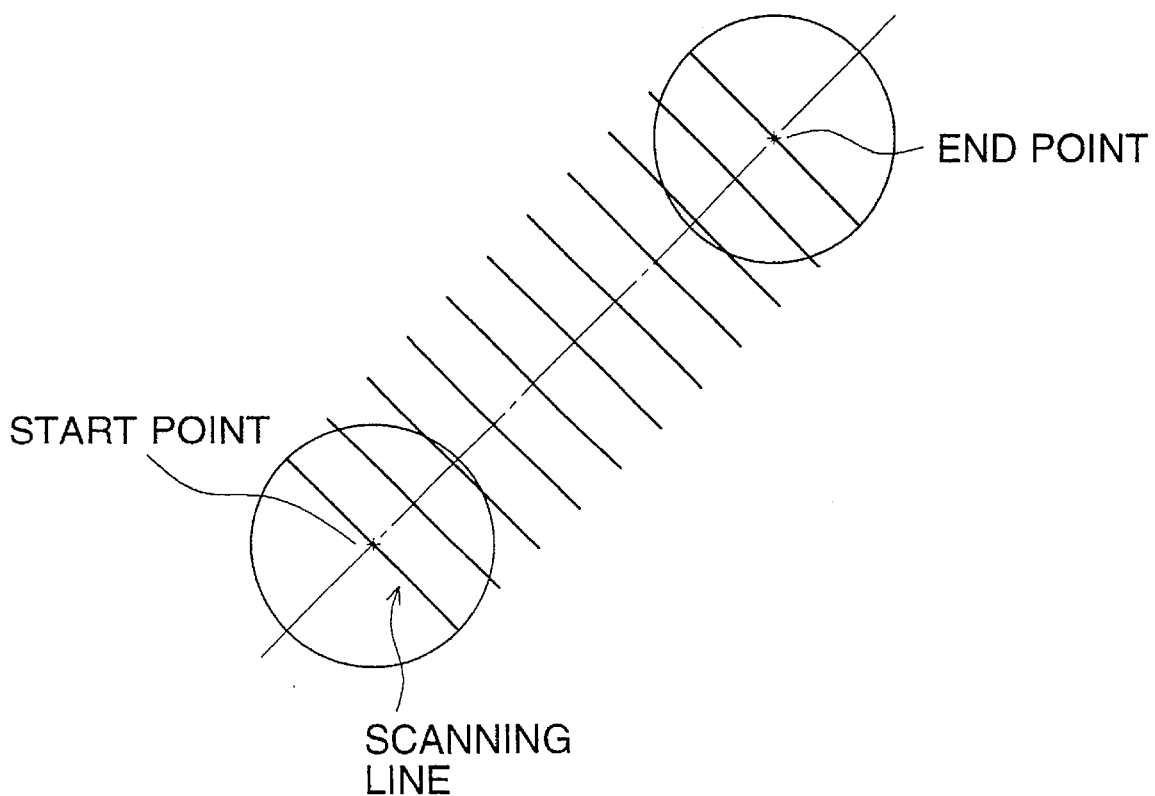
FIG. 11 is a view showing the circumstances of extraction of a contour point in the belt-shaped region.

Successively, the scanning operation is conducted on the image data in the width direction crossing with a center line which connects the start point with the end point of the belt-shaped region, wherein the scanning operation is stated from the start point (shown in FIG. 11). On the scanning line (on a row of the image data), a candidate of the contour point crossing with the contour line of the primary image is computed (S34: contour line extracting means). Specifically, for each image data (for each color plane), a difference of data between the adjacent pixels is found on the scanning line (on the row of image data), and when an amount of the difference is not less than a predetermined value, the pixel position is determined as a contour candidate point.

Extraction of the contour point is not limited to the above case in which the image data of R, G, B, H, S and L are used. Also, the invention is not limited to the case in which a change of data between the pixels is computed for each color plane. Data deviation between color planes may be found so that the contour point can be found.

Further, the following construction may be adopted. In the same manner as the first example described before, different from the designation of the belt-shaped region (cutout processing region), a region (condition setting region) including the background of the primary image is designated, and according to the image data included in the designated region, a threshold value (cutout condition) used for the computation of the contour point on the scanning line is set.

The aforementioned computation of the contour point is conducted from the start point to the end point at regular intervals each time the end point is set, wherein the regular interval is one pixel unit or the length of a plurality of pixels. Continuity of the contour candidate points found on each scanning line is evaluated, and the contour candidate points on each scanning line is selected from the start point to the end point (S35). The contour candidate point selected in the above manner is made to be a vector value, that is, the contour points are connected with each other, so that a contour line can be provided (S36). Then the contour line is displayed on the CRT5 (displaying means) being put on the original image.

An operator can visually check the contour line on the CRT5 which has been extracted according to the designated start and end points. Due to the foregoing, it can be judged whether or not the automatically extracted contour line is appropriate, and further it is possible to estimate the result of contour extraction. Accordingly, the displayed result of extraction can be used as a target of the renewal setting of the end point position. When the end point position is designated in this way, the extracted contour line can be guided in a predetermined direction.

From the displayed result of extraction of the contour, misoperation can be found, for example, when a wrong contour line is traced, the operator can judge the misoperation. In this case, in the new designation of the end point, it is possible to eliminate a portion traced by the misoperation from the belt-shaped region, and it is also possible to change an interval of the designated end positions so that a predetermined contour line can be correctly traced. Each time the end point position is designated, detection of the contour point is conducted again from the start point. Therefore, the evaluation of continuity is changed in accordance with the setting of a new end point position, and the predetermined contour line can be traced.

Next, a more preferable embodiment based on the cutout processing control will be explained as follows.

As illustrated in FIG. 9, a profile of the belt-shaped region which has been set according to the designation of the start and end point positions is determined to be a locus of a circle, the center of which is moved from the start point to the end point. Basically, the profile is formed when two circles are connected with straight lines. Due to the foregoing, the contour extracting region of a constant width (diameter of the circle) can be set irrespective of a direction of the belt-shaped region. Therefore, the extracting accuracy of the contour line can be maintained constant. In this case, it is preferable that the width of the belt-shaped region is variably set. When it is automatically set as follows, the extracting accuracy of the contour line can be enhanced.

Figure 12:
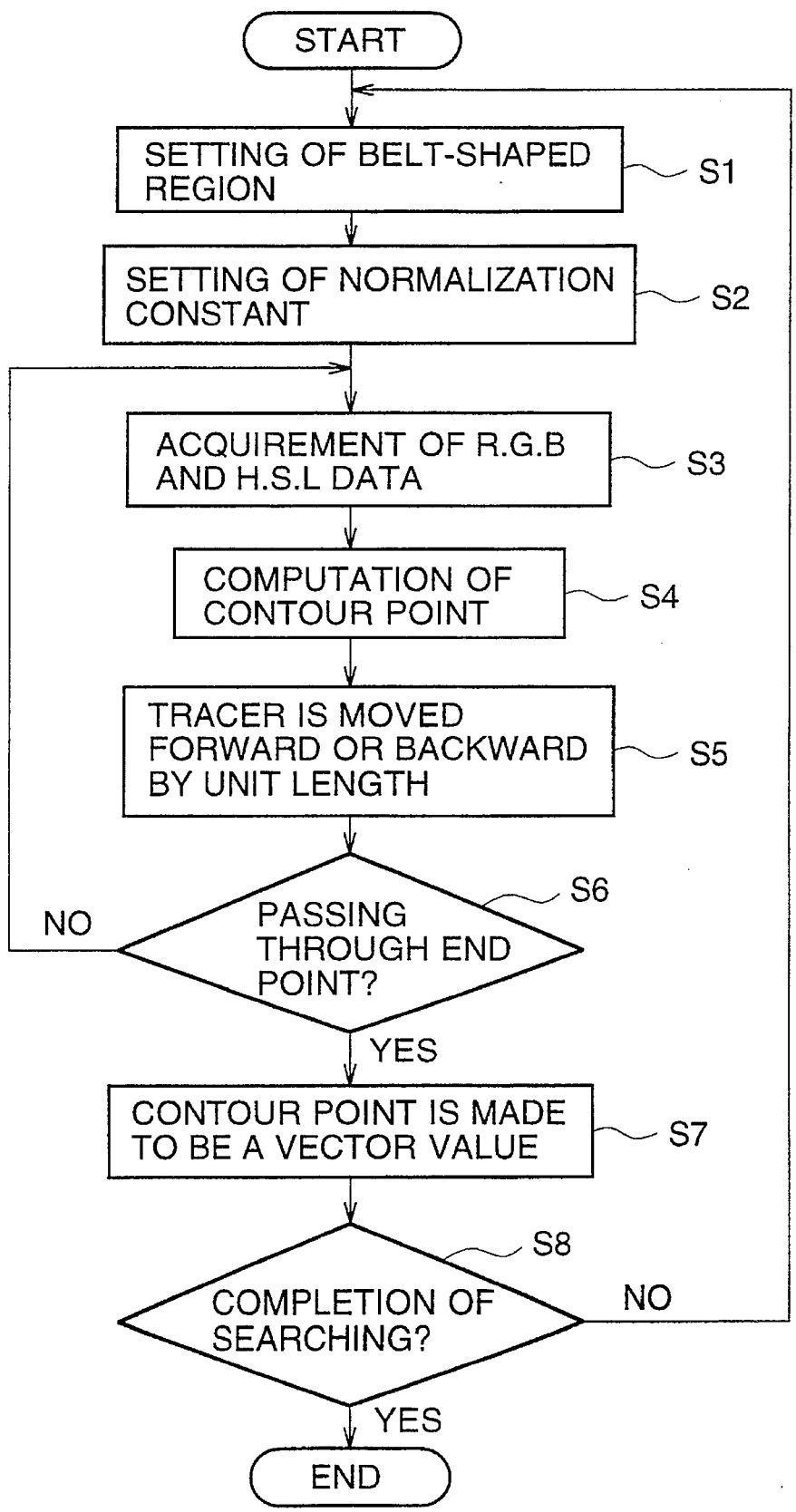
FIG. 12 is a flow chart showing a basic example of the contour line searching method.

Next, a basic example of the cutout image contour line searching method in which the above system is used will be explained with reference to the flow chart shown in FIG. 12.

In step 1, as illustrated in FIG. 9, the start and end points are set on the contour line of an image to be cut out, and a belt-shaped region connecting the two points is set. This belt-shaped region is displayed on the image plane. In this way, the belt-shaped region can be set in the same manner as that of pen writing, so that the operational feeling agrees with the human.

In step 2, the normalization constant of a plurality of image data necessary for searching the contour line is determined. Specifically, the normalization constant is set so that the evaluation values of R (red), G (green) and B (blue) can be the same as those of H (hue), S (saturation) and L (lightness). That is, the data of R, G and B are converted into the data of H, S and L by a conventional method. In order to make a comparison equally in the later process of finding the contour, a difference between the maximum and the minimum with respect to each of the data (R, G, B, H, S and L), and normalization is conducted in accordance with the expression of $X=X/(X_{max}-X_{min})\times 100$. In this case, X=R, G, B, H, S and L.

In step 3, the scanning operation is conducted on the image data in the width direction crossing with a center line which connects the start point with the end point of the belt-shaped region. In this way, the data of R, G and B are obtained for each pixel. On the other hand, the data of R, G and B are converted into the data of H, S and L, so that 6 pieces of data are obtained for one pixel. In this connection, this scanning operation is started in a direction of the start point.

In step 4, in accordance with the 6 pieces of data, a contour point is computed, at which the scanning line crosses with the contour line of a desired cutout image. Specifically, a difference of the data between adjacent pixels is found for each of the 6 pieces of data, and a contour point candidate is extracted from the difference. Then the continuity of the contour candidate and that extracted by the tracer before movement is evaluated, so that the contour point candidate is selected. In this connection, the tracer of the contour line searching processing means is composed of the image data acquiring function of the belt width direction in step 3, and the contour point computing fuction based on the image data in step 4.

In step 5, the tracer is moved in the longitudinal direction of the belt-shaped region. That is, a point moved from a point on the center line in the belt-width direction scanning by unit length is determined a point on the center line used in the next scanning. In this case, when it is moved by one pixel unit length, the cutout accuracy is enhanced, and when it is moved by the length of a plurality of pixels, the processing capacity is enhanced.

In step 6, it is judged whether or not the aforementioned setting point has passed through the end point.

In the case where the aforementioned setting point has not passed through the end point, the program returns to step 2 and passes through the aforementioned new setting point, and the scanning operation is conducted in a direction crossing with the center line, so that a contour point is computed on the scanning line.

As described above, while the tracer is gradually moved from the start point to the end point, the contour point is found, and when the tracer has reached the end point, the program advances to step 7. Then each contour point is made to be a vector value (the contour points are connected with each other) and a contour line can be obtained.

In step 8, whether the contour line searching is completed or not is read in. In accordance with a command given by the operator, whether the contour line searching is completed or not may be read in. Alternatively, whether the contour line searching is completed or not may be automatically read in when the end point is located close to the start point and the contour line is formed into a loop-shape. In the case where the cutout line searching operation is not completed, the program returns to step 1, and a new belt-shaped region is set so that the contour line is searched.

concerning the belt-width setting system, with respect to the size of an image to be cut out, the belt-width of which is displayed, a predetermined ratio (ratio of the number of pixels) is set, that is, a ratio of 1/20 is set.

According to the reading resolution of an image, the pixel values expressing the structure of the image are different. Therefore, it is set so that the belt-width can be a predetermined ratio with respect to the cutout portion. For example, when a comparison is made between an image of life-size and an image of 400%, arrangements of adjacent pixels composing the same contour line are greatly different. In this example, a belt-width appropriate for cutting out is selected according to an image region to be cut out which is designated by the operator, and also according to the image size. The selected pixel ratio is 1:20. It is preferable that the pixel ratio is set at 1:15 to 1:25. When the pixel ratio is lower than that range, the contour line tends to be affected by noise, so that the estimated contour line becomes unstable. When the pixel ratio is higher than that range, it becomes difficult to extract an appropriate contour point. It is more preferable that the pixel ratio is 1:18 to 1:22. In this case, unless a contour line of the image is recognized, the size (the number of pixels) of the displayed image to be cut out can not be provided. Therefore, for example, a square region approximately circumscribed about the image to be cut out is set, and in accordance with the size of the square region (in accordance with the number of pixels), the belt-width can be set.

Figure 13:
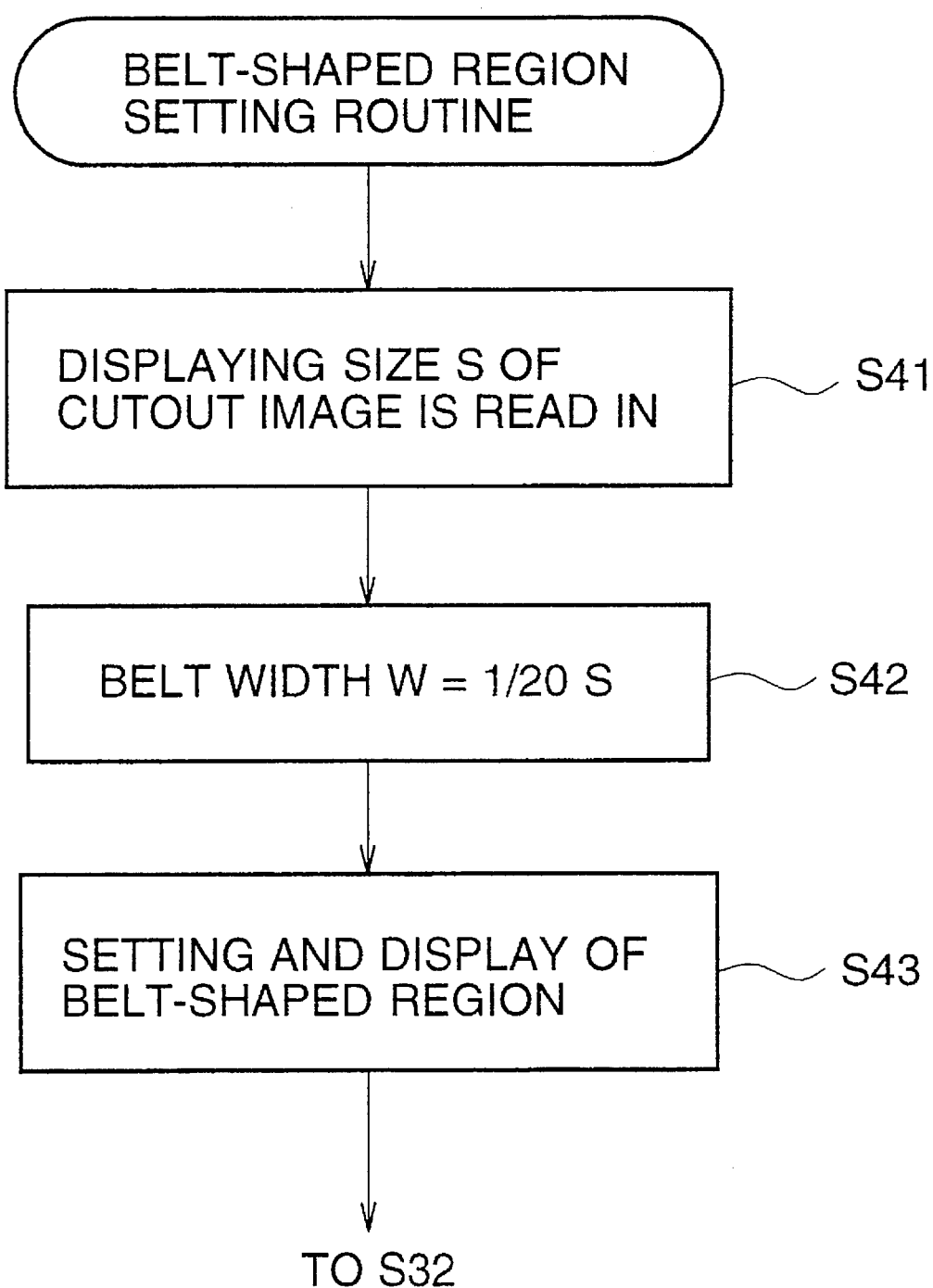
FIG. 13 is a flow chart showing the circumstances of width setting conducted in the belt-shaped region.

This example (the subroutine of S31 shown in FIG. 10) is shown in FIG. 13.

In FIG. 13, first, the indicated size S of an image to be cut out is read in (S41). Next, the belt-width W is set at 1/20·S, which is a ratio of the number of pixels (S42). A belt-shaped region of the width W connecting the start point with the end point is set, and at the same time the belt-shaped region is displayed on the CRT5 (S43).

Even in the case of an image of the same size, a ratio of change in the contour line is locally increased. Therefore, it is preferable that the belt-width W can be manually set, too.

In this connection, when the belt-shaped region is set only linearly, with respect to a contour line of which the radius of curvature is large, the start point and the end point are connected by a short belt-shaped region, and this setting operation must be conducted a large number of times. In order to solve the above problem, the belt-shaped region is curved by a command given the operator, so that a long contour line can be included in one belt-shaped region. In this way, the number of setting operation can be reduced. A specific curving method is to use the Bezier Function.

Figure 14:
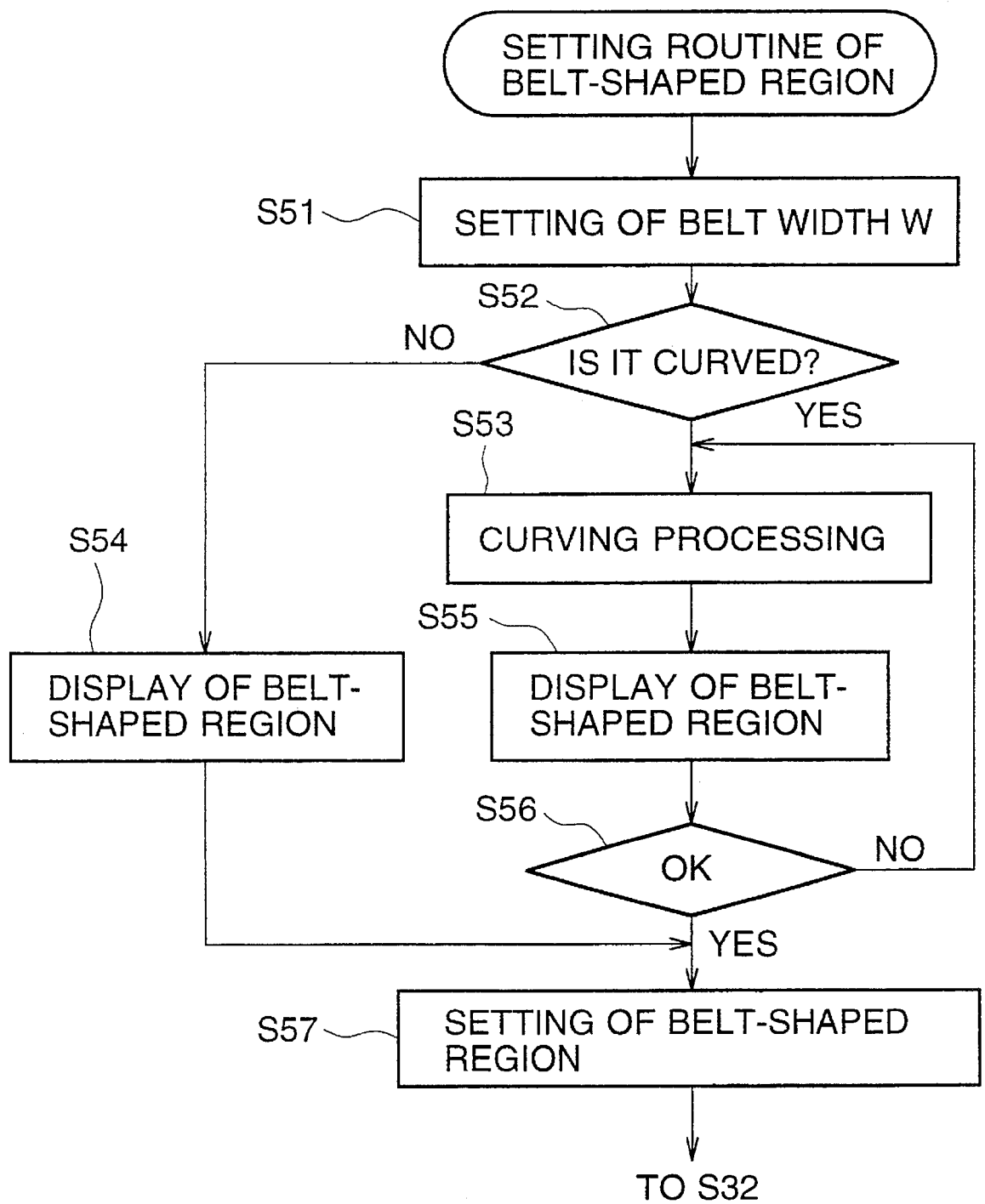
FIG. 14 is a flow chart showing the example in which the belt-shaped region is curved.

This example (the subroutine of S31 shown in FIG. 10) is shown in FIG. 14.

In FIG. 14, first, the belt-width W is set by the method described above (S51). Next, a command of the operator is read in so as to decide whether or not the belt-shaped region is curved (S52). In the case where the belt-shaped region is not curved, the linear belt-shaped region is displayed as it is (S54). In the case where the belt-shaped region is curved, curving processing is conducted using the Bezier Function (S53), and at the same time the curved belt-shaped region is displayed on the CRT5 (S55).

After that, the operator judges whether or not the curved belt-shaped region is appropriate (S56). Then the curving processing operation is continued until an appropriate curved belt-shaped region is obtained. When the appropriate curved belt-shaped region is obtained, the belt-shaped region is finally determined (S57).

On the other hand, in the case where a plurality of contour candidate points are detected on the same scanning line, it is preferable that the belt-shaped region is previously weighted in the width direction (the scanning direction) in order to determine a truly desirable contour point.

When an operator establishes a belt-shaped region, there is a high possibility that the operator unconsciously sets a center line of the belt-shaped region at a position close to a desirable cutout contour line. For this reason, image data close to the center of the belt-shaped region in the width direction is heavily weighted, and image data close to the end portion is lightly weighted. In the case where there are a plurality of contour point candidates, a heavily weighted candidate is selected. However, at the start and end points, there is a high possibility that the contour line is close to the center of the belt width, and in the intermediate portion, there is a possibility that the contour line is separated from the center. Accordingly, only portions close to the start and end points may be weighted, and the degree of weighting may be changed in accordance with a distance from the start or end point.

Figure 15:
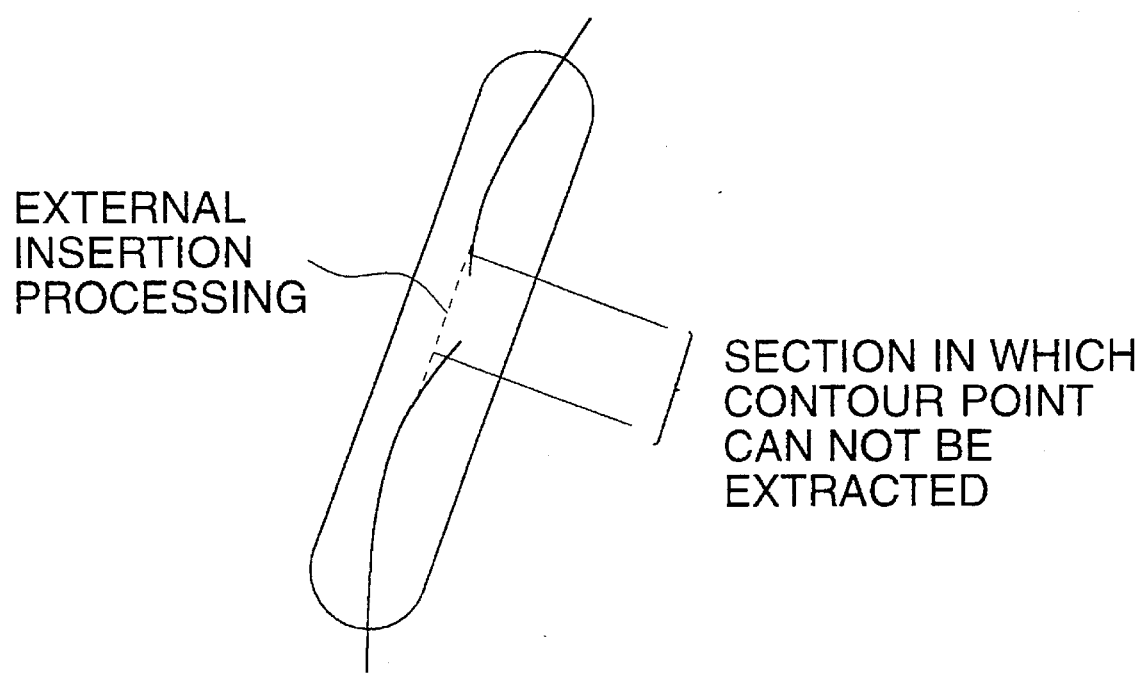
FIG. 15 is a view for explaining the circumstances of extrapolation of the contour line.

In the case where a change in the density and color in the belt-width scanning direction is small and it is difficult to discriminate the contour point from the difference of each data, the contour line is determined by means of extrapolation in the extending direction of the belt-shaped region as shown in FIG. 15.

Alternatively, the following method may be adopted. It is judged whether or not the determined contour point is close to the contour point previously determined on the scanning line. In the case where the determined contour point is not close to the contour point previously determined on the scanning line, it is judged that the contour point has been determined by mistake, and then the contour point is determined by means of extrapolation in the same manner as described above. Alternatively, in the case where a plurality of contour point candidates are on the same scanning line, the second candidate is compared with the previously determined contour point. In the case where it is close to the previously determined contour point, the second candidate is selected instead of the first candidate.

Figure 16:
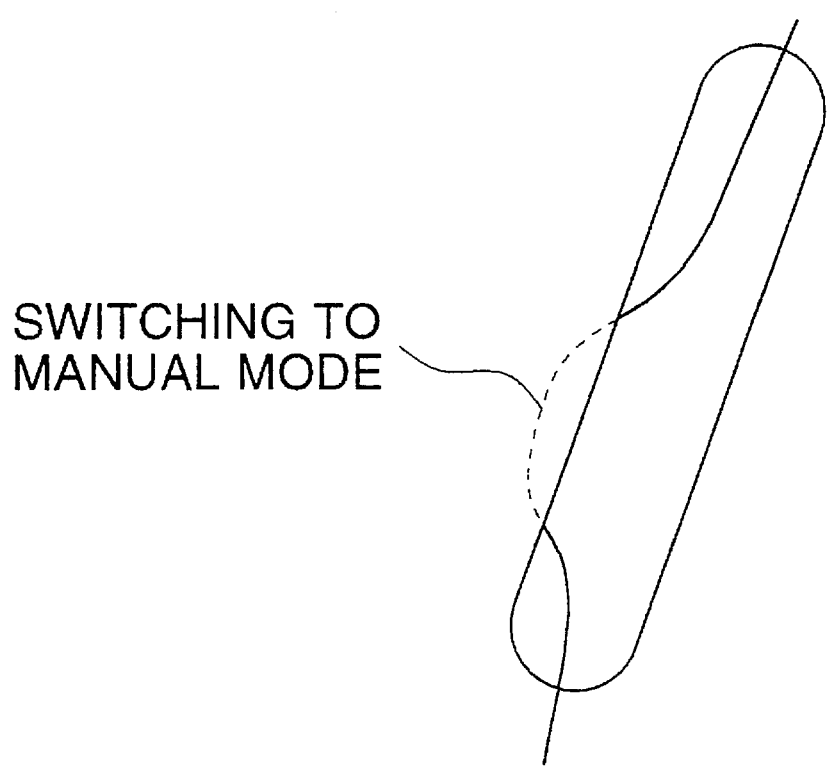
FIG. 16 is a view for explaining the circumstances in which the mode is switched to the manual mode.

In the case where the contour point determined in the above manner separates from the center of the belt-shaped region and reaches an end of the belt width as illustrated in FIG. 16, it is judged at this point of time that the contour line is out of the belt-shaped region, and the mode is automatically switched to a manual setting mode in which the cutout image contour line is manually set. In this case, the operator may trace the contour line using a pointing device with respect to a region out of the belt-shaped region, and when the contour line enters the belt-shaped region again, the mode may be switched to the automatic mode.

Figure 17:
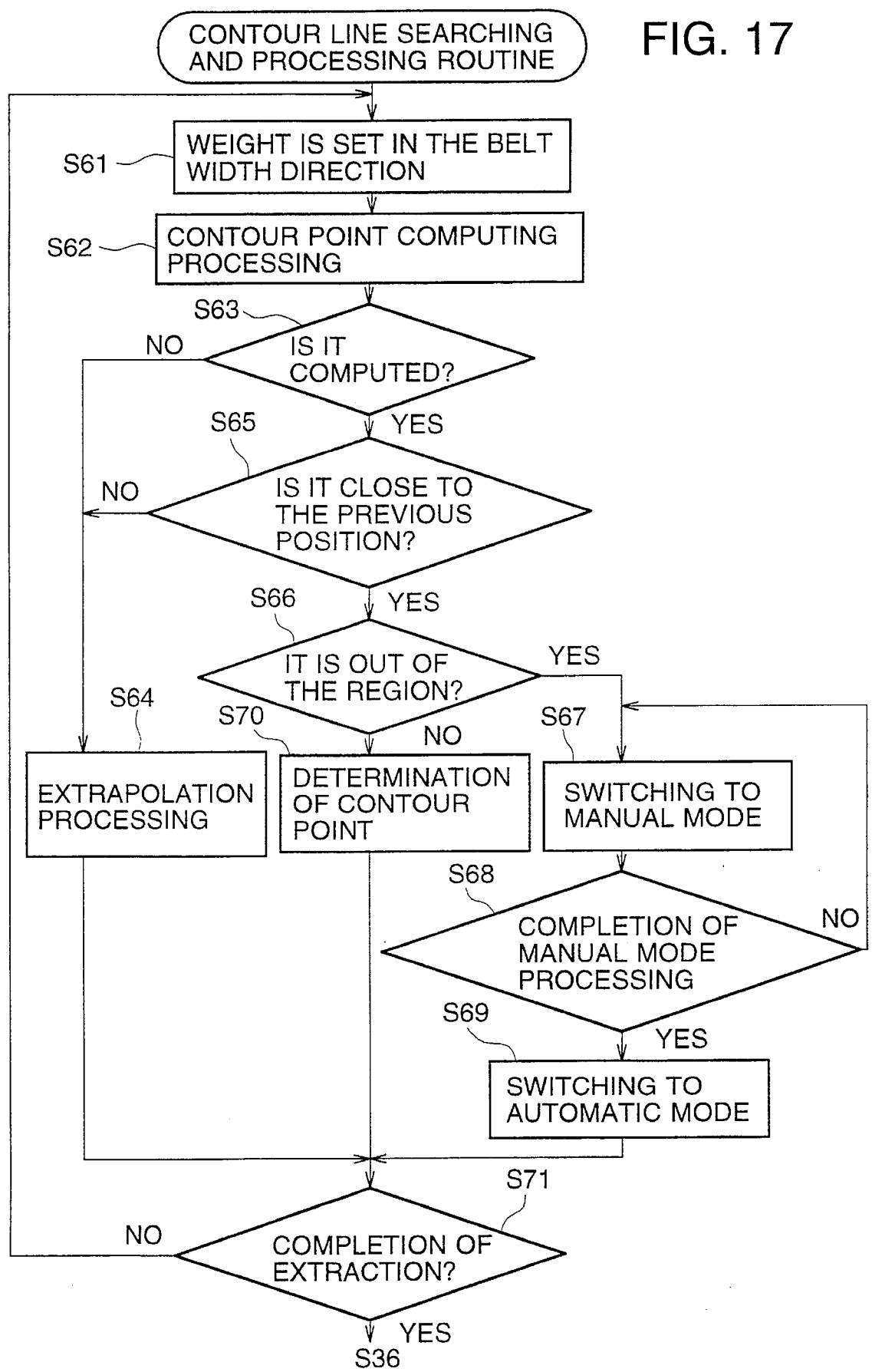
FIG. 17 is a flow chart showing the detail of contour line searching processing.

FIG. 17 shows an example (the subroutine of S34 and S35 shown in FIG. 10) which includes the aforementioned contour line extracting method.

In the drawing, first, a weighting distribution is established for determining the contour point in the belt-width direction (S61).

Next, according to the image data in the belt width direction in the belt-shaped region, a contour point is computed. In the case where a plurality of contour point candidates have been computed, the contour point is determined in accordance with the weighting distribution (S62).

Then, it is judged whether or not the contour point has been computed by the aforementioned processing, that is, it is judged whether or not the contour point can be computed because the maximum difference level is too small (S63).

In the case where it has been judged that the contour point can not be computed, the extrapolation processing is conducted in the manner described above, so that the contour line is established with respect to the section in which the contour point can not be computed (S64). In this connection, in the case where the contour point can not be computed, the mode may be switched to the manual operation mode, so that the contour point can be manually designated by the pointing device operation with respect to the portion in which the contour point can not be computed.

On the other hand, in the case where the contour point has been computed, it is judged whether or not the computed contour point is located close to the contour point determined by the previous scanning operation (S65). In the case where the computed contour point is separate from the contour point determined by the previous scanning operation, the aforementioned extrapolation processing is conducted, or the contour point is designated by manual operation (S64). In the case where the computed contour point is close to the contour point determined by the previous scanning operation, it is judged whether or not the computed contour point is located at an edge of the belt-shaped region and whether or not the computed contour point is estimated to be out of the region (S66).

In the case where it has been judged that the computed contour point is estimated to be out of the region, the mode is switched to the manual mode in which the contour line is manually set (S67).

Next, it is discriminated whether or not the contour line setting has been completed by the manual mode (S68). At a point of time of completion, that is, at a point of time when it has returned to the belt-shaped region, the mode is switched to the automatic extraction mode (automatic searching mode) (S69).

In the case where the automatically extracted contour line is out of the belt-shaped region, there is a high possibility that the setting of the belt-shaped region is not appropriate and a desired contour line is out of the belt-shaped region. Therefore, the width of the belt-shaped region is automatically extended in a predetermined range, or the belt-shaped region is automatically curved, and then the contour point is computed. Alternatively, the operator may be demanded to conduct the designation of the end point again.

On the other hand, in the case where it has been judged that the contour point is not out of the belt-shaped region (S66), the computed contour point is finally determined to be a true contour point (S70).

Then, it is judged whether or not the computation of the contour point has been completed (S71). The aforementioned processing is repeated until the computation of the contour point is completed.

As described above, according to the present invention, a belt-shaped region is set along the contour line on a cutout image of a displayed image in accordance with the sense of an operator. The operation is simple as described above. When the length of the belt-shaped region is arbitrarily designated, the overall contour line can be accurately searched with a small number of setting operations.

When the contour line is searched while the tracer for extracting a contour point is being moved, the searching accuracy can be enhanced.

When the width of the belt-shaped region is set in accordance with a ratio based on the displayed size of a cutout image, the belt-shaped region can be more easily set.

When a profile of the belt-shaped region is set to be an external locus of a circle moved between two predetermined points. Due to the foregoing, the contour line searching accuracy can be stabilized irrespective of a direction of the region.

When a weight distribution for determining the contour point by the tracer is set in the belt width direction of the belt-shaped region, erroneous extraction of the contour point can be suppressed.

When a profile of the belt-shaped region is set so that the profile can be curved in the longitudinal direction, the number of region setting can be reduced, and the contour line searching accuracy can be enhanced.

When the tracer has determined a contour point at the outside of the belt-shaped region, the contour line searching operation is stopped, and the operation mode is automatically changed to the manual cutout contour line setting mode. Therefore, even when the contour line is out of the belt-shaped region so that the searching can not be continued, countermeasure can be taken.

When a contour line is set along the longitudinal direction of the belt-shaped region by means of extrapolation, it is possible to estimate the contour line with a high probability.

As described before, the present invention provides the following effects:

According to the image cutout apparatus of the first embodiment of the present invention, a region in which image cutout processing is conducted is designated, and a region in which the cutout condition is established is differently designated. In accordance with image data in the cutout condition setting region, the condition is established and the cutout processing is conducted. Therefore, the cutout condition appropriate for the characteristics of each image can be handily established. Accordingly, image cutout operation can be stably conducted on various original images.

According to the image cutout apparatus of the second embodiment of the present invention, the cutout condition is established according to a plurality of designated regions. For example, in the case of a primary image, the background of which varies, an appropriate cutout condition can be established.

According to the image cutout apparatus of the third embodiment of the present invention, the designated regions for establishing the cutout condition are weighted in accordance with the order of designation. Therefore, the cutout condition setting according to the designation of a plurality of regions can be appropriately conducted.

According to the image cutout apparatus of the fourth embodiment of the present invention, when the cutout condition is commonly applied to a plurality of cutout processing regions, cutout processing operation can be systematically conducted in each processing region.

According to the image cutout apparatus of the fifth embodiment of the present invention, a different condition setting region is established for each cutout processing region. Accordingly, even when the cutout condition is greatly changed for each processing region, a desired image cutout operation can be carried out.

According to the image cutout apparatus of the sixth embodiment of the present invention, when the cutout processing region overlaps with the condition setting region, the overlapping region is weighted, and the cutout condition is established. Therefore, the cutout condition can be established so that it is more appropriate for the image characteristics in the cutout processing region.

According to the image cutout apparatus of the seventh embodiment of the present invention, when a primary point of the cutout contour is inputted in such a manner that the point is put on a coordinate, a belt-shaped region appropriate for handy contour extraction can be established. Further, the contour extraction result is displayed together with the aforementioned established region, so that the operation conducted by an operator can be made easy.

According to the image cutout apparatus of the eighth embodiment of the present invention, contour extraction is conducted each time the end point of the belt-shaped region is renewed. Therefore, the extracted contour can be intentionally guided by the designation of the end point position.

According to the image cutout apparatus of the ninth embodiment of the present invention, a contour point is computed in the belt width direction of the belt-shaped region. Therefore, a desired contour point located at the center of the belt width can be accurately computed. Further, when the computation of these contour points is conducted from the start point to the end point of the belt-shaped region, the contour points can be easily guided by the operator.

According to the image cutout apparatus of the tenth embodiment of the present invention, the contour of an original color image can be accurately found by the computation of image data for each color plane or between the color planes.

What is claimed is:

1. An apparatus for searching a contour line of an image to be cut out, comprising:
   displaying means for displaying an image obtained through photoelectric conversion scanning of an original image;
   belt-shaped region setting means for setting a belt-shaped region by designating at least two points located along the contour line of an image to be cut out;
   processing means for processing image data in the belt-shaped region that has been set by said belt-shaped region setting means;
   contour line searching means for searching the contour line of the image to be cut out, based on the image data processed by said processing means;
   a tracer for extracting a contour point located on the contour line of an image in accordance with an image data in a width direction of the belt-shaped region; and
   wherein the tracer is moved in a direction perpendicular to the width direction so as to continuously extract each contour point, thereby searching the contour line; and
   wherein said belt-shaped region setting means is arranged such that a weight distribution for determining a contour point by said tracer is set in the width direction of the belt-shaped region.

2. The apparatus of claim 1, further comprising mode switching means for automatically switching to a manual cutout contour line setting mode, and
   wherein when said tracer determines a contour point outside the belt-shaped region, a searching operation of the contour line is stopped, and the mode is automatically switched to the manual cutout contour line setting mode.

3. The apparatus of claim 1, wherein said contour line searching means is arranged such that when said tracer cannot extract a contour line, the contour line is set by means of an extrapolation along a direction perpendicular to the width direction of the belt-shaped region.

4. The apparatus of claim 1, wherein said belt-shaped region setting means is arranged such that a configuration of the belt-shaped region can be curved in a direction perpendicular to the width direction of the belt-shaped region.

5. An apparatus for searching a contour line of an image to be cut out, comprising:
   displaying means for displaying an image obtained through photoelectric conversion scanning of an original image;
   belt-shaped region setting means for setting a belt-shaped region by designating at least two points located along the contour line of an image to be cut out;
   processing means for processing image data in the belt-shaped region that has been set by said belt-shaped region setting means; and
   contour line searching means for searching the contour line of the image to be cut out, based on the image data processed by said processing means; and
   wherein said belt-shaped region setting means is arranged such that a width of the belt-shaped region is set at a ratio, based on a size of a cutout image displayed by said displaying means.

6. The apparatus of claim 5, wherein said belt-shaped region setting means is arranged such that a configuration of the belt-shaped region can be curved in a direction perpendicular to the width direction of the belt-shaped region.

7. An apparatus for searching a contour line of an image to be cut out, comprising:
   displaying means for displaying an image obtained through photoelectric conversion scanning of an original image;
   belt-shaped region setting means for setting a belt-shaped region by designating at least two points located along the contour line of an image to be cut out;
   processing means for processing image data in the belt-shaped region that has been set by said belt-shaped region setting means; and
   contour line searching means for searching the contour line of the image to be cut out, based on the image data processed by said processing means; and
   wherein said belt-shaped region setting means is arranged such that a configuration of the belt-shaped region coincides with an external locus of a circle moved between two designated points.

8. The apparatus of claim 7, wherein said belt-shaped region setting means is arranged such that a configuration of the belt-shaped region can be curved in a direction perpendicular to the width direction of the belt-shaped region.

* * * * *